US009410711B2

(12) United States Patent
Wilson et al.

(10) Patent No.: US 9,410,711 B2
(45) Date of Patent: Aug. 9, 2016

(54) FAN ASSEMBLY

(71) Applicant: Dyson Technology Limited, Wiltshie (GB)

(72) Inventors: Hugo George Wilson, Bristol (GB); Thomas Greer Duvall, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 175 days.

(21) Appl. No.: 14/495,452

(22) Filed: Sep. 24, 2014

(65) Prior Publication Data

US 2015/0084214 A1 Mar. 26, 2015

(30) Foreign Application Priority Data

Sep. 26, 2013 (GB) .................................. 1317098.0

(51) Int. Cl.
*F24F 6/12* (2006.01)
*F24F 6/16* (2006.01)
*F24F 3/14* (2006.01)
(Continued)

(52) U.S. Cl.
CPC . *F24F 6/16* (2013.01); *C02F 1/325* (2013.01); *F24F 3/14* (2013.01); *F24F 6/00* (2013.01); *F24F 6/12* (2013.01); *C02F 2201/322* (2013.01); *C02F 2303/04* (2013.01); *C02F 2307/12* (2013.01); *F24F 2003/1667* (2013.01); *F24F 2006/006* (2013.01); *F24F 2006/008* (2013.01)

(58) Field of Classification Search
CPC ......... F24F 3/14; F24F 6/00; F24F 2006/006; F24F 2006/008; F24F 6/12; F24F 6/14; B01F 3/04; B01F 3/04063; B01F 3/0407
USPC ..................................... 261/30, 72.1, 78.2, 81
See application file for complete search history.

(56) References Cited

U.S. PATENT DOCUMENTS

| 284,962 A | 9/1883 | Huston |
| 1,357,261 A | 11/1920 | Svoboda |

(Continued)

FOREIGN PATENT DOCUMENTS

| BE | 560119 | 8/1957 |
| CA | 1055344 | 5/1979 |

(Continued)

OTHER PUBLICATIONS

Staniforth et al., U.S. Office Action mailed Jun. 4, 2015, directed to U.S. Appl. No. 13/784,430; 17 pages.

(Continued)

*Primary Examiner* — Robert A Hopkins
(74) *Attorney, Agent, or Firm* — Morrison & Foerster LLP

(57) ABSTRACT

Humidifying apparatus includes a body comprising a chamber into which water is supplied by a water tank. An air flow is generated over water stored in the chamber, and a humidifying system humidifies the air flow with water from the chamber. Water in the chamber is irradiated by an ultraviolet radiation emitting lamp. The lamp forms part of a cartridge removably locatable within the body so that the lamp is received within an ultraviolet radiation transparent tube of the chamber. The body includes a plurality of supports for supporting the cartridge therebetween. Each support has a curved track for guiding movement of the cartridge towards the tube, the tracks being shaped to orient the cartridge for insertion of the lamp into the tube as the cartridge moves along the tracks towards the tube.

11 Claims, 15 Drawing Sheets

(51) Int. Cl.
*F24F 6/00* (2006.01)
*C02F 1/32* (2006.01)
*F24F 3/16* (2006.01)

(56) References Cited

U.S. PATENT DOCUMENTS

| | | |
|---|---|---|
| 1,767,060 A | 6/1930 | Ferguson |
| 1,896,869 A | 2/1933 | Larsh |
| 2,014,185 A | 9/1935 | Martin |
| 2,035,733 A | 3/1936 | Wall |
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,755,106 A | 7/1956 | Brennan et al. |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,264,837 A | 4/1981 | Gaboriaud |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,716,946 A | 1/1988 | Grigoletto |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| D343,231 S | 1/1994 | Lim |
| 5,296,769 A | 3/1994 | Havens et al. |
| D346,017 S | 4/1994 | Lim |
| 5,310,313 A | 5/1994 | Chen |
| 5,317,815 A | 6/1994 | Hwang |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,483,616 A | 1/1996 | Chiu et al. |
| 5,518,370 A | 5/1996 | Wang et al. |
| D374,712 S | 10/1996 | Jane et al. |
| 5,609,473 A | 3/1997 | Litvin |
| 5,645,769 A | 7/1997 | Tamaru et al. |
| 5,649,370 A | 7/1997 | Russo |
| D382,951 S | 8/1997 | Deines et al. |
| 5,671,321 A | 9/1997 | Bagnuolo |
| 5,677,982 A | 10/1997 | Levine et al. |
| 5,706,985 A | 1/1998 | Feer |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| 5,794,306 A | 8/1998 | Firdaus |
| D398,983 S | 9/1998 | Keller et al. |
| 5,841,080 A | 11/1998 | Iida et al. |
| 5,843,344 A | 12/1998 | Junket et al. |
| 5,859,952 A | 1/1999 | Levine et al. |
| 5,862,037 A | 1/1999 | Behl |
| 5,868,197 A | 2/1999 | Potier |
| 5,881,685 A | 3/1999 | Foss et al. |
| 5,922,247 A | 7/1999 | Shoham et al. |
| D415,271 S | 10/1999 | Feer |
| 6,015,274 A | 1/2000 | Bias et al. |
| D423,663 S | 4/2000 | Rossman et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,200,155 B1 | 3/2001 | Chudkosky et al. |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| 6,604,694 B1 | 8/2003 | Kordas et al. |
| D483,851 S | 12/2003 | Fok |
| D485,895 S | 1/2004 | Melwani |
| D486,903 S | 2/2004 | Chiang |
| 6,715,739 B2 | 4/2004 | Mulvaney et al. |
| 6,789,787 B2 | 9/2004 | Stutts |
| 6,791,056 B2 | 9/2004 | VanOtteren et al. |
| 6,830,433 B2 | 12/2004 | Birdsell et al. |
| 6,845,971 B2 | 1/2005 | Bachert |
| D512,772 S | 12/2005 | Lee |
| D513,067 S | 12/2005 | Blateri |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |

(56) References Cited

U.S. PATENT DOCUMENTS

| | | | |
|---|---|---|---|
| 7,198,473 B2 | 4/2007 | Stickland et al. | |
| D544,078 S | 6/2007 | Geringer | |
| 7,362,964 B2 * | 4/2008 | Wang | F24F 6/00 261/104 |
| 7,412,781 B2 | 8/2008 | Mattinger et al. | |
| 7,478,993 B2 | 1/2009 | Hong et al. | |
| 7,540,474 B1 | 6/2009 | Huang et al. | |
| D595,835 S | 7/2009 | Fu | |
| D598,532 S | 8/2009 | Dyson et al. | |
| D602,143 S | 10/2009 | Gammack et al. | |
| D602,144 S | 10/2009 | Dyson et al. | |
| D605,748 S | 12/2009 | Gammack et al. | |
| 7,660,110 B2 | 2/2010 | Vinson et al. | |
| 7,664,377 B2 | 2/2010 | Liao | |
| D614,280 S | 4/2010 | Dyson et al. | |
| 7,731,050 B2 | 6/2010 | Parks et al. | |
| 7,775,848 B1 | 8/2010 | Auerbach | |
| 7,806,388 B2 | 10/2010 | Junkel et al. | |
| 7,841,045 B2 | 11/2010 | Shaanan et al. | |
| D633,997 S | 3/2011 | Hideharu et al. | |
| D633,999 S | 3/2011 | Hideharu et al. | |
| 7,931,449 B2 | 4/2011 | Fitton et al. | |
| D638,114 S | 5/2011 | Li et al. | |
| D643,098 S | 8/2011 | Wallace et al. | |
| 8,002,520 B2 | 8/2011 | Dawson et al. | |
| D644,726 S | 9/2011 | Hideharu et al. | |
| D645,133 S | 9/2011 | Hideharu | |
| D646,373 S | 10/2011 | Liebson et al. | |
| 8,092,166 B2 | 1/2012 | Nicolas et al. | |
| 8,113,490 B2 | 2/2012 | Chen | |
| 8,152,495 B2 | 4/2012 | Boggess, Jr. et al. | |
| 8,246,317 B2 | 8/2012 | Gammack | |
| D669,164 S | 10/2012 | Hsu | |
| 8,308,445 B2 | 11/2012 | Gammack et al. | |
| D672,023 S | 12/2012 | Wallace et al. | |
| D672,024 S | 12/2012 | Fitton et al. | |
| 8,348,629 B2 | 1/2013 | Fitton et al. | |
| 8,356,804 B2 | 1/2013 | Fitton et al. | |
| D676,536 S | 2/2013 | Roach et al. | |
| D678,993 S | 3/2013 | Kung-Hua | |
| 8,403,640 B2 | 3/2013 | Gammack et al. | |
| 8,408,869 B2 | 4/2013 | Hutton et al. | |
| D681,793 S | 5/2013 | Li | |
| D684,249 S | 6/2013 | Herbst | |
| 8,454,322 B2 | 6/2013 | Gammack et al. | |
| 8,469,660 B2 | 6/2013 | Dyson et al. | |
| 8,529,226 B2 | 9/2013 | Li | |
| 8,544,826 B2 | 10/2013 | Ediger et al. | |
| D698,018 S | 1/2014 | Choi | |
| D700,959 S | 3/2014 | Sickinger et al. | |
| 8,684,687 B2 | 4/2014 | Dyson et al. | |
| D705,415 S | 5/2014 | Lo | |
| 8,721,286 B2 | 5/2014 | Gammack et al. | |
| 8,721,307 B2 | 5/2014 | Li | |
| 8,764,412 B2 | 7/2014 | Gammack et al. | |
| 8,783,663 B2 | 7/2014 | Fitton et al. | |
| 8,784,071 B2 | 7/2014 | Gammack | |
| 2001/0017212 A1 | 8/2001 | Hirano | |
| 2002/0104972 A1 | 8/2002 | Guzorek | |
| 2002/0106547 A1 | 8/2002 | Sugawara et al. | |
| 2002/0190400 A1 | 12/2002 | Bachert | |
| 2003/0059307 A1 | 3/2003 | Moreno et al. | |
| 2003/0064677 A1 | 4/2003 | Terrell et al. | |
| 2003/0164367 A1 | 9/2003 | Bucher et al. | |
| 2003/0171093 A1 | 9/2003 | Gumucio Del Pozo | |
| 2003/0190183 A1 | 10/2003 | Hsing | |
| 2003/0230477 A1 | 12/2003 | Fink et al. | |
| 2004/0022631 A1 | 2/2004 | Birdsell et al. | |
| 2004/0049842 A1 | 3/2004 | Prehodka | |
| 2004/0106370 A1 | 6/2004 | Honda et al. | |
| 2004/0149881 A1 | 8/2004 | Allen | |
| 2005/0031448 A1 | 2/2005 | Lasko et al. | |
| 2005/0053465 A1 | 3/2005 | Roach et al. | |
| 2005/0069407 A1 | 3/2005 | Winkler et al. | |
| 2005/0128698 A1 | 6/2005 | Huang | |
| 2005/0163670 A1 | 7/2005 | Alleyne et al. | |
| 2005/0173997 A1 | 8/2005 | Schmid et al. | |
| 2005/0194167 A1 | 9/2005 | Kiyota et al. | |
| 2005/0258554 A1 | 11/2005 | Bachert | |
| 2005/0281672 A1 | 12/2005 | Parker et al. | |
| 2006/0172682 A1 | 8/2006 | Orr et al. | |
| 2006/0199515 A1 | 9/2006 | Lasko et al. | |
| 2006/0263073 A1 | 11/2006 | Clarke et al. | |
| 2006/0279927 A1 | 12/2006 | Strohm | |
| 2007/0009354 A1 | 1/2007 | Zahuranec | |
| 2007/0035189 A1 | 2/2007 | Matsumoto | |
| 2007/0041857 A1 | 2/2007 | Fleig | |
| 2007/0065280 A1 | 3/2007 | Fok | |
| 2007/0166160 A1 | 7/2007 | Russak et al. | |
| 2007/0176502 A1 | 8/2007 | Kasai et al. | |
| 2007/0224044 A1 | 9/2007 | Hong et al. | |
| 2007/0237500 A1 | 10/2007 | Wang | |
| 2007/0269323 A1 | 11/2007 | Zhou et al. | |
| 2008/0020698 A1 | 1/2008 | Spaggiari | |
| 2008/0124060 A1 | 5/2008 | Gao | |
| 2008/0152482 A1 | 6/2008 | Patel | |
| 2008/0166224 A1 | 7/2008 | Giffin | |
| 2008/0286130 A1 | 11/2008 | Purvines | |
| 2008/0314250 A1 | 12/2008 | Cowie et al. | |
| 2009/0026850 A1 | 1/2009 | Fu | |
| 2009/0032130 A1 | 2/2009 | Dumas et al. | |
| 2009/0039805 A1 | 2/2009 | Tang | |
| 2009/0060710 A1 | 3/2009 | Gammack et al. | |
| 2009/0060711 A1 | 3/2009 | Gammack et al. | |
| 2009/0078120 A1 | 3/2009 | Kummer et al. | |
| 2009/0120925 A1 | 5/2009 | Lasko | |
| 2009/0191054 A1 | 7/2009 | Winkler | |
| 2009/0214341 A1 | 8/2009 | Craig | |
| 2009/0301482 A1 | 12/2009 | Burton et al. | |
| 2010/0133707 A1 | 6/2010 | Huang | |
| 2010/0150699 A1 | 6/2010 | Nicolas et al. | |
| 2010/0162011 A1 | 6/2010 | Min | |
| 2010/0171465 A1 | 7/2010 | Seal et al. | |
| 2010/0225012 A1 | 9/2010 | Fitton et al. | |
| 2010/0226749 A1 | 9/2010 | Gammack et al. | |
| 2010/0226750 A1 | 9/2010 | Gammack | |
| 2010/0226751 A1 | 9/2010 | Gammack et al. | |
| 2010/0226752 A1 | 9/2010 | Gammack et al. | |
| 2010/0226753 A1 | 9/2010 | Dyson et al. | |
| 2010/0226754 A1 | 9/2010 | Hutton et al. | |
| 2010/0226758 A1 | 9/2010 | Cookson et al. | |
| 2010/0226763 A1 | 9/2010 | Gammack et al. | |
| 2010/0226764 A1 | 9/2010 | Gammack et al. | |
| 2010/0226769 A1 | 9/2010 | Helps | |
| 2010/0226771 A1 | 9/2010 | Crawford et al. | |
| 2010/0226787 A1 | 9/2010 | Gammack et al. | |
| 2010/0226797 A1 | 9/2010 | Fitton et al. | |
| 2010/0226801 A1 | 9/2010 | Gammack | |
| 2010/0254800 A1 | 10/2010 | Fitton et al. | |
| 2011/0058935 A1 | 3/2011 | Gammack et al. | |
| 2011/0080724 A1 | 4/2011 | Jörgensen | |
| 2011/0110805 A1 | 5/2011 | Gammack et al. | |
| 2011/0164959 A1 | 7/2011 | Fitton et al. | |
| 2011/0223014 A1 | 9/2011 | Crawford et al. | |
| 2011/0223015 A1 | 9/2011 | Gammack et al. | |
| 2011/0236228 A1 | 9/2011 | Fitton et al. | |
| 2012/0031509 A1 | 2/2012 | Wallace et al. | |
| 2012/0033952 A1 | 2/2012 | Wallace et al. | |
| 2012/0034108 A1 | 2/2012 | Wallace et al. | |
| 2012/0039705 A1 | 2/2012 | Gammack | |
| 2012/0045315 A1 | 2/2012 | Gammack | |
| 2012/0045316 A1 | 2/2012 | Gammack | |
| 2012/0051884 A1 | 3/2012 | Junkel et al. | |
| 2012/0057959 A1 | 3/2012 | Hodgson et al. | |
| 2012/0082561 A1 | 4/2012 | Gammack et al. | |
| 2012/0093629 A1 | 4/2012 | Fitton et al. | |
| 2012/0093630 A1 | 4/2012 | Fitton et al. | |
| 2012/0107096 A1 | 5/2012 | Yang et al. | |
| 2012/0114513 A1 | 5/2012 | Simmonds et al. | |
| 2012/0230658 A1 | 9/2012 | Fitton et al. | |
| 2012/0308375 A1 | 12/2012 | Gammack | |
| 2012/0318393 A1 | 12/2012 | Tsen | |
| 2012/0319311 A1 | 12/2012 | Nutter et al. | |
| 2013/0011252 A1 | 1/2013 | Crawford et al. | |

(56) References Cited

U.S. PATENT DOCUMENTS

| | | | |
|---|---|---|---|
| 2013/0026664 A1 | 1/2013 | Staniforth et al. |
| 2013/0028763 A1 | 1/2013 | Staniforth et al. |
| 2013/0028766 A1 | 1/2013 | Staniforth et al. |
| 2013/0077292 A1 | 3/2013 | Zimmerman |
| 2013/0129490 A1 | 5/2013 | Dos Reis et al. |
| 2013/0142676 A1 | 6/2013 | Zou |
| 2013/0143481 A1 | 6/2013 | Kagawa et al. |
| 2013/0161842 A1 | 6/2013 | Fitton et al. |
| 2013/0175711 A1 | 7/2013 | Nutter et al. |
| 2013/0199372 A1 | 8/2013 | Nock et al. |
| 2013/0234346 A1 | 9/2013 | Staniforth et al. |
| 2013/0234347 A1 | 9/2013 | Staniforth et al. |
| 2013/0249122 A1 | 9/2013 | Staniforth et al. |
| 2013/0249124 A1 | 9/2013 | Staniforth et al. |
| 2013/0249126 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0309065 A1 | 11/2013 | Johnson et al. |
| 2013/0309080 A1 | 11/2013 | Johnson et al. |
| 2013/0320574 A1 | 12/2013 | Sickinger et al. |
| 2013/0323100 A1 | 12/2013 | Poulton et al. |
| 2013/0336771 A1 | 12/2013 | Dyson et al. |
| 2014/0017069 A1 | 1/2014 | Peters |
| 2014/0077398 A1* | 3/2014 | Staniforth ............... F04F 5/16 261/32 |
| 2014/0079566 A1 | 3/2014 | Gammack et al. |
| 2014/0084492 A1 | 3/2014 | Staniforth et al. |
| 2014/0210114 A1 | 7/2014 | Staniforth et al. |
| 2014/0210115 A1 | 7/2014 | Staniforth et al. |
| 2014/0255173 A1 | 9/2014 | Poulton et al. |
| 2014/0255217 A1 | 9/2014 | Li |
| 2016/0032927 A1 | 2/2016 | Johnson et al. |
| 2016/0032941 A1 | 2/2016 | Beavis et al. |
| 2016/0033148 A1 | 2/2016 | Darvill |
| 2016/0033150 A1 | 2/2016 | Staniforth et al. |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 1446116 | 10/2003 |
| CN | 2650005 | 10/2004 |
| CN | 2713643 | 7/2005 |
| CN | 1680727 | 10/2005 |
| CN | 1724950 | 1/2006 |
| CN | 2833197 | 11/2006 |
| CN | 201011346 | 1/2008 |
| CN | 201147215 | 11/2008 |
| CN | 201180678 | 1/2009 |
| CN | 201221477 | 4/2009 |
| CN | 101424279 | 5/2009 |
| CN | 101451754 | 6/2009 |
| CN | 201281416 | 7/2009 |
| CN | 201349269 | 11/2009 |
| CN | 101684828 | 3/2010 |
| CN | 201486901 | 5/2010 |
| CN | 101726100 | 6/2010 |
| CN | 101749288 | 6/2010 |
| CN | 201502549 | 6/2010 |
| CN | 201507461 | 6/2010 |
| CN | 201518985 | 7/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 101825324 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 301539668 | 5/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 202101355 | 1/2012 |
| CN | 102367813 | 3/2012 |
| CN | 202267207 | 6/2012 |
| CN | 301949285 | 6/2012 |
| CN | 202431623 | 9/2012 |
| CN | 102900654 | 1/2013 |
| CN | 103697556 | 4/2014 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 039 783 | 4/2010 |
| DE | 10 2009 007 037 | 8/2010 |
| EP | 0 044 494 | 1/1982 |
| EP | 0 186 581 | 7/1986 |
| EP | 0 459 812 | 12/1991 |
| EP | 0 784 947 | 7/1997 |
| EP | 0 846 868 | 6/1998 |
| EP | 1 094 224 | 4/2001 |
| EP | 1 138 954 | 10/2001 |
| EP | 1357296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2 230 467 | 9/2010 |
| EP | 2 414 738 | 2/2012 |
| EP | 2 578 889 | 4/2013 |
| FR | 1033034 | 7/1953 |
| FR | 1119439 | 6/1956 |
| FR | 1387334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 861749 | 2/1961 |
| GB | 863124 | 3/1961 |
| GB | 1067956 | 5/1967 |
| GB | 1 262 131 | 2/1972 |
| GB | 1 265 341 | 3/1972 |

(56) References Cited

FOREIGN PATENT DOCUMENTS

| | | |
|---|---|---|
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484671 | 4/2012 |
| GB | 2484695 | 4/2012 |
| GB | 2484761 | 4/2012 |
| GB | 2493231 | 1/2013 |
| GB | 2493505 | 2/2013 |
| GB | 2493507 | 2/2013 |
| GB | 2499041 | 8/2013 |
| GB | 2500005 | 9/2013 |
| GB | 2500010 | 9/2013 |
| GB | 2500011 | 9/2013 |
| GB | 2500012 | 9/2013 |
| GB | 2504415 | 1/2014 |
| JP | 31-13055 | 8/1956 |
| JP | 35-4369 | 3/1960 |
| JP | 39-7297 | 3/1964 |
| JP | 46-7230 | 12/1971 |
| JP | 47-21718 | 10/1972 |
| JP | 49-43764 | 4/1974 |
| JP | 49-150403 | 12/1974 |
| JP | 50-92046 | 8/1975 |
| JP | 51-7258 | 1/1976 |
| JP | 52-121045 | 9/1977 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-98099 | 5/1987 |
| JP | 62-223494 | 10/1987 |
| JP | 63-36794 | 3/1988 |
| JP | 63-179198 | 7/1988 |
| JP | 63-198933 | 12/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |
| JP | 1-224598 | 9/1989 |
| JP | 2-146294 | 6/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-99386 | 4/1993 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-111174 | 4/1995 |
| JP | 7-190443 | 7/1995 |
| JP | 8-21400 | 1/1996 |
| JP | 8-72525 | 3/1996 |
| JP | 8-313019 | 11/1996 |
| JP | 9-100800 | 4/1997 |
| JP | 9-178083 | 7/1997 |
| JP | 9-287600 | 11/1997 |
| JP | 11-83094 | 3/1999 |
| JP | 11-502586 | 3/1999 |
| JP | 11-227866 | 8/1999 |
| JP | 2000-55419 | 2/2000 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-4265 | 1/2003 |
| JP | 2003-161473 | 6/2003 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 2006-189221 | 7/2006 |
| JP | 3124510 | 8/2006 |
| JP | 3127331 | 11/2006 |
| JP | 2007-138763 | 6/2007 |
| JP | 2007-138789 | 6/2007 |
| JP | 2008-39316 | 2/2008 |
| JP | 2008-100204 | 5/2008 |
| JP | 3144127 | 8/2008 |
| JP | 3146538 | 10/2008 |
| JP | 2008-292078 | 12/2008 |
| JP | 2008-294243 | 12/2008 |
| JP | 2009-44568 | 2/2009 |
| JP | 2009-62986 | 3/2009 |
| JP | D1371413 | 10/2009 |
| JP | 2009-275925 | 11/2009 |
| JP | D1376284 | 12/2009 |
| JP | 2010-46411 | 3/2010 |
| JP | 2010-131259 | 6/2010 |
| JP | 2010-203760 | 9/2010 |
| JP | 2010-203764 | 9/2010 |
| JP | 2012-31806 | 2/2012 |
| JP | 2013-185821 | 9/2013 |
| KR | 1999-002660 | 1/1999 |
| KR | 10-2005-0102317 | 10/2005 |
| KR | 10-2007-0007997 | 1/2007 |
| KR | 20-0448319 | 3/2010 |
| KR | 10-2010-0055611 | 5/2010 |
| KR | 10-0985378 | 9/2010 |
| KR | 10-2011-0096588 | 8/2011 |
| TW | 517825 | 1/2003 |

(56) References Cited

FOREIGN PATENT DOCUMENTS

| | | |
|---|---|---|
| TW | 589932 | 6/2004 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/050041 | 4/2011 |
| WO | WO-2011/147318 | 12/2011 |
| WO | WO-2012/006882 | 1/2012 |
| WO | WO-2012/033517 | 3/2012 |
| WO | WO-2012/052737 | 4/2012 |
| WO | WO-2013/014419 | 1/2013 |
| WO | WO-2013/132218 | 9/2013 |
| WO | WO-2013/132222 | 9/2013 |

OTHER PUBLICATIONS

Dyson et al., U.S. Office Action mailed May 28, 2015, directed to U.S. Appl. No. 29/460,993; 9 pages.
Staniforth et al., U.S. Office Action mailed Mar. 17, 2015, directed to U.S. Appl. No. 13/785,787; 18 pages.
Staniforth et al., U.S. Office Action mailed Feb. 27, 2015, directed to U.S. Appl. No. 13/786,014; 7 pages.
Dyson et al., U.S. Office Action mailed Apr. 27, 2015, directed to U.S. Appl. No. 29/460,994; 6 pages.
Dyson et al., U.S. Office Action mailed Apr. 24, 2015, directed to U.S. Appl. No. 29/460,990; 6 pages.
Dyson et al., U.S. Office Action mailed Apr. 10, 2015, directed to U.S. Appl. No. 29/460,989; 7 pages.
Staniforth et al., U.S. Office Action mailed Sep. 11, 2015, directed to U.S. Appl. No. 13/785,787; 16 pages.
Staniforth et al., U.S. Office Action mailed Sep. 30, 2015, directed to U.S. Appl. No. 13/786,014; 8 pages.
Staniforth et al., U.S. Office Action mailed Oct. 15, 2015, directed to U.S. Appl. No. 13/786,313; 18 pages.
Staniforth et al., U.S. Office Action mailed Feb. 2, 2016, directed to U.S. Appl. No. 13/784,430; 19 pages.
Staniforth et al., U.S. Office Action mailed Sep. 21, 2015, directed to U.S. Appl. No. 13/785,954; 16 pages.
Staniforth et al., U.S. Office Action mailed Sep. 25, 2015, directed to U.S. Appl. No. 13/786,226; 20 pages.
Staniforth et al., U.S. Office Action mailed Aug. 27, 2015, directed to U.S. Appl. No. 13/786,082; 20 pages.
Search Report dated Mar. 17, 2014, directed to GB Application No. 1317098.0; 2 pages.
Reba, I. (1966). "Applications of the Coanda Effect," *Scientific American* 214:84-92.
Third Party Submission Under 37 CFR 1.99 filed Jun. 2, 2011, directed to U.S. Appl. No. 12/203,698; 3 pages.
Gammack et al., U.S. Office Action mailed Dec. 9, 2010, directed to U.S. Appl. No. 12/203,698; 10 pages.
Gammack et al., U.S. Office Action mailed Jun. 21, 2011, directed to U.S. Appl. No. 12/203,698; 11 pages.
Gammack et al., Office Action mailed Sep. 17, 2012, directed to U.S. Appl. No. 13/114,707; 12 pages.
Gammack et al., U.S. Office Action mailed Dec. 10, 2010, directed to U.S. Appl. No. 12/230,613; 12 pages.
Gammack et al., U.S. Office Action mailed May 13, 2011, directed to U.S. Appl. No. 12/230,613; 13 pages.
Gammack et al., U.S. Office Action mailed Sep. 7, 2011, directed to U.S. Appl. No. 12/230,613; 15 pages.
Gammack et al., U.S. Office Action mailed Jun. 8, 2012, directed to U.S. Appl. No. 12/230,613; 15 pages.
Gammack et al., U.S. Office Action mailed Aug. 20, 2012, directed to U.S. Appl. No. 12/945,558; 15 pages.
Fitton et al., U.S. Office Action mailed Nov. 30, 2010 directed to U.S. Appl. No. 12/560,232; 9 pages.
Nicolas et al., U.S. Office Action mailed Mar. 7, 2011, directed to U.S. Appl. No. 12/622,844; 10 pages.
Nicolas et al., U.S. Office Action mailed Sep. 8, 2011, directed to U.S. Appl. No. 12/622,844; 11 pages.
Gammack et al., U.S. Office Action mailed Dec. 9, 2010, directed to U.S. Appl. No. 12/716,781; 17 pages.
Gammack et al., U.S.Office Action mailed Jun. 24, 2011, directed to U.S. Appl. No. 12/716,781; 19 pages.
Fitton et al., U.S. Office Action mailed Mar. 30, 2012, directed to U.S. Appl. No. 12/716,707; 7 pages.
Fitton et al., U.S. Office Action mailed Dec. 31, 2013, directed to U.S. Appl. No. 13/718,693; 8 pages.
Staniforth et al., U.S. Office Action mailed Sep. 18, 2014, directed to U.S. Appl. No. 13/559,142; 18 pages.
Gammack et al. U.S. Office Action mailed Oct. 18, 2012, directed to U.S. Appl. No. 12/917,247; 11 pages.
Gammack et al., U.S. Office Action mailed Apr. 12, 2011, directed to U.S. Appl. No. 12/716,749; 8 pages.
Gammack et al., U.S. Office Action mailed Sep. 1, 2011, directed to U.S. Appl. No. 12/716,749; 9 pages.
Gammack et al., U.S. Office Action mailed Jun. 25, 2012, directed to U.S. Appl. No. 12/716,749; 11 pages.
Gammack et al., U.S. Office Action mailed May 24, 2011, directed to U.S. Appl. No. 12/716,613; 9 pages.
Fitton et al., U.S. Office Action mailed Mar. 8, 2011, directed to U.S. Appl. No. 12/716,780; 12 pages.
Fitton et al., U.S. Office Action mailed Sep. 6, 2011, directed to U.S. Appl. No. 12/716,780; 16 pages.
International Search Report and Written Opinion mailed Nov. 19, 2014, directed to International Application No. PCT/GB2014/052848; 9 pages.
Gammack et al., U.S. Office Action mailed Feb. 28, 2013, directed to U.S. Appl. No. 12/945,558; 16 pages.
Gammack et al., U.S. Office Action mailed Jun. 12, 2013, directed to U.S. Appl. No. 12/945,558; 20 pages.
Helps et al., U.S. Office Action mailed Feb. 15, 2013, directed to U.S. Appl. No. 12/716,694; 12 pages.
Gammack et al., U.S. Office Action mailed May 29, 2013, directed to U.S. Appl. No. 13/588,666; 11 pages.
Gammack et al., U.S. Office Action mailed Sep. 27, 2013, directed to U.S. Appl. No. 13/588,666; 10 pages.
Gammack et al., U.S. Office Action mailed Mar. 14, 2013, directed to U.S. Appl. No. 12/716,740; 15 pages.
Gammack et al., U.S. Office Action mailed Sep. 6, 2013, directed to U.S. Appl. No. 12/716,740; 15 pages.
Gammack et al., U.S. Office Action mailed Apr. 24, 2014, directed to U.S. Appl. No. 12/716,740; 16 pages.
Li et al., U.S. Office Action mailed Oct. 25, 2013, directed to U.S. Appl. No. 13/686,480; 17 pages.
Fitton et al., U.S. Office Action mailed Jun. 13, 2014, directed to U.S. Appl. No. 13/274,998; 11 pages.
Fitton et al., U.S. Office Action mailed Jun. 13, 2014, directed to U.S. Appl. No. 13/275,034; 10 pages.
Gammack et al., U.S. Office Action mailed Feb. 14, 2013, directed to U.S. Appl. No. 12/716,515; 21 pages.
Gammack et al., U.S. Office Action mailed Aug. 19, 2013, directed to U.S. Appl. No. 12/716,515; 20 pages.
Gammack et al., U.S. Office Action mailed Feb. 10, 2014, directed to U.S. Appl. No. 12/716,515; 21 pages.

(56) References Cited

OTHER PUBLICATIONS

Gammack et al., U.S. Office Action mailed Sep. 3, 2014, directed to U.S. Appl. No. 13/861,891; 7 pages.
Wallace et al., U.S. Office Action mailed Jun. 7, 2013, directed to U.S. Appl. No. 13/192,223; 30 pages.
Wallace et al., U.S. Office Action mailed Oct. 23, 2013, directed to U.S. Appl. No. 13/192,223; 18 pages.
Dos Reis et al., U.S. Office Action mailed Sep. 23, 2014, directed to U.S. Appl. No. 29/466,240; 9 pages.
Dos Reis et al., U.S. Office Action mailed Sep. 24, 2014, directed to U.S. Appl. No. 29/466,229; 9 pages.
Dos Reis et al., U.S. Office Action mailed Sep. 19, 2014, directed to U.S. Appl. No. 29/466,190; 9 pages.
Mcpherson et al., U.S. Office Action mailed Sep. 19, 2014, directed to U.S. Appl. No. 29/466,094; 8 pages.
Mcpherson et al., U.S. Office Action mailed Sep. 19, 2014, directed to U.S. Appl. No. 29/466,241; 8 pages.
Mcpherson et al., U.S. Office Action mailed Sep. 19, 2014, directed to U.S. Appl. No. 29/466,253; 7 pages.
Dyson et al., U.S. Office Action mailed Sep. 12, 2014, directed to U.S. Appl. No. 29/480,896; 10 pages.
Dyson et al., U.S. Office Action mailed Sep. 12, 2014, directed to U.S. Appl. No. 29/480,915; 9 pages.
Poulton et al., U.S. Office Action mailed Sep. 12, 2014, directed to U.S. Appl. No. 29/480,919; 10 pages.
Deniss. (Sep. 9, 2010) "iFan, The Chinese Clone of the Dyson Air Multiplier," located at <http://chinitech.com/en/chinese-clones/ifan-le-clone-chinois-du-dyson-air-multiplier> visited on Aug. 29, 2014. (6 pages).
Amee. (Mar. 29, 2012) "Breeze Right Bladeless Fan Up to 41% Off," located at <http://madamedeals.com/breeze-right-bladeless-fan-up-to-41-off/> visited on Sep. 3, 2014. (2 pages).
Questel. (Jun. 11, 2014) "Designs-Questel" located at <http://sobjprd.questel.fr/export/QPTUJ214/pdf2/19f053ea-a60f-4c58-9232-c458147a9adf-224304.pdf/> visited on Sep. 4, 2014. (67 pages).
Amazon. "Pisenic Bladeless Fan 16 Inches with Remote Control, Bladeless Fan Air Conditioner 110v, Air Multiplier Table Fans, Green," located at <http://www.amazon.com/Pisenic-Bladeless-Fan-16-Conditioner/dp/B007VCI78M%3FSubscriptionid%3DAKIAJYLII7AAJMX7ETAA%26tag%3Dtk78-20%26linkCode%3Dxm2%26camp%3D2025%26creative%3D165953%26creativeASIN%3DB007VCI78M#cm_cr_dpwidget> visited on Sep. 2, 2014. (4 pages).
Steiner, L., (May 14, 2013) "Dyson Fan Heater Review: Cozy Up to Dyson Fan Heater," located at <http://www.vissbiz.com/dyson-fan-heater-review/cozy-up-to-dyson-fan-heater/> visited on Sep. 3, 2014. (3 pages).
Staniforth et al., U.S. Office Action mailed Mar. 11, 2016, directed to U.S. Appl. No. 13/785,954; 16 pages.
Staniforth et al., U.S. Office Action mailed Mar. 1, 2016, directed to U.S. Appl. No. 13/786,226; 19 pages.
Staniforth et al., U.S. Office Action mailed Mar. 1, 2016, directed to U.S. Appl. No. 13/786,082; 19 pages.
Staniforth et al., U.S. Office Action mailed May 2, 2016, directed to U.S. Appl. No. 14/166,152; 18 pages.
Staniforth et al., U.S. Office Action mailed Mar. 30, 2016, directed to U.S. Appl. No. 14/166,472; 47 pages.

* cited by examiner

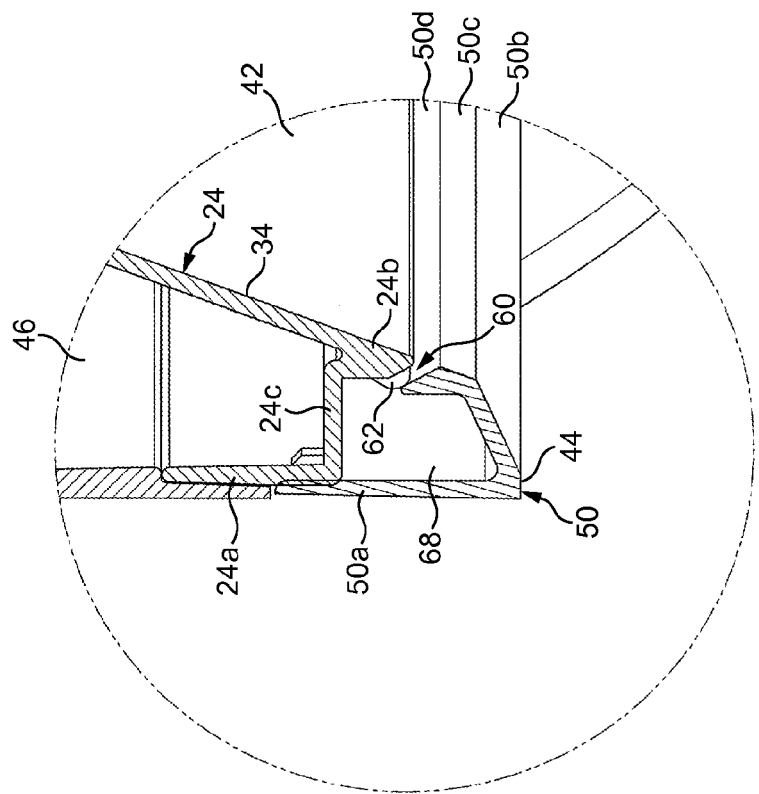
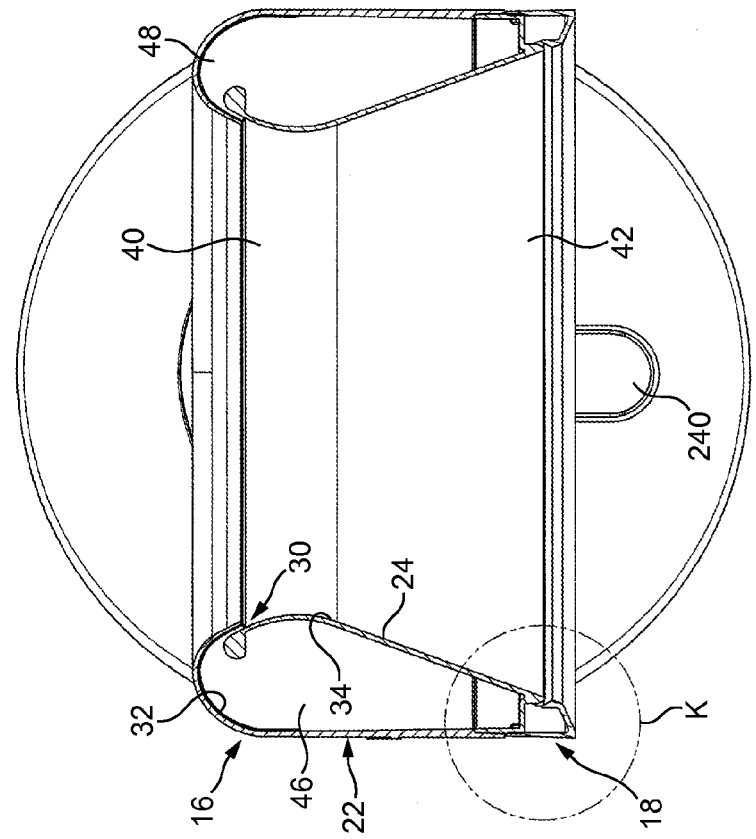
FIG. 5B
FIG. 5A

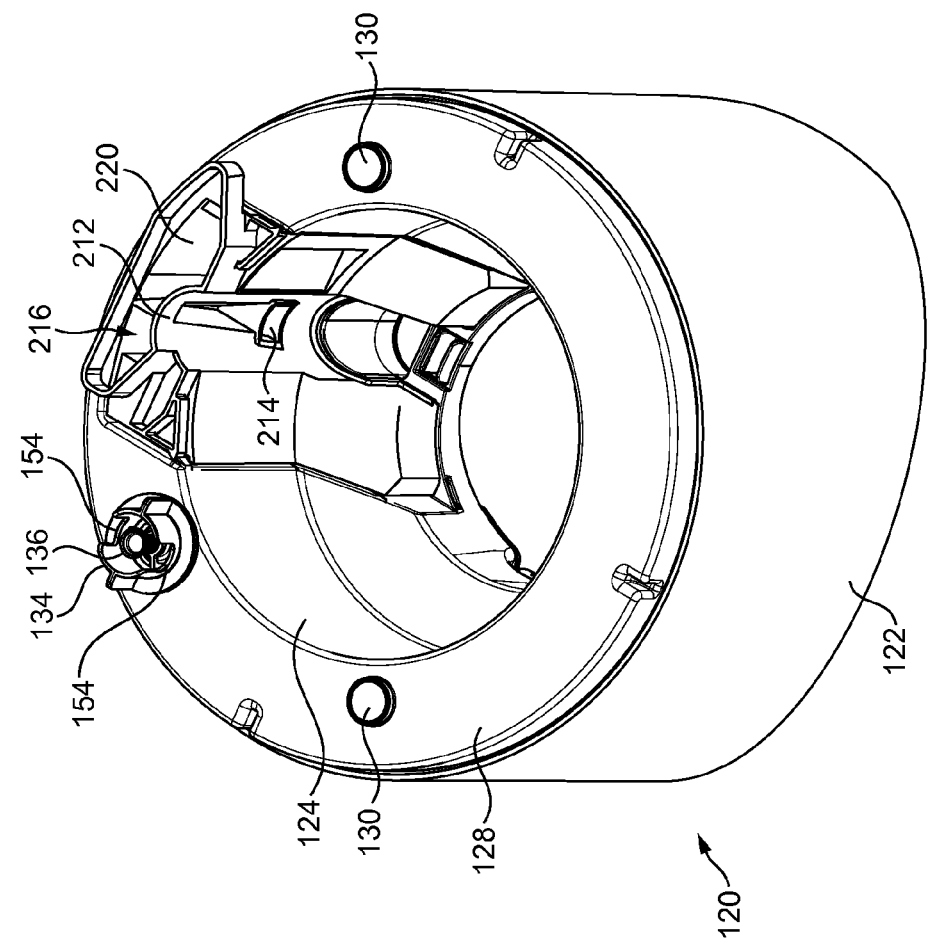
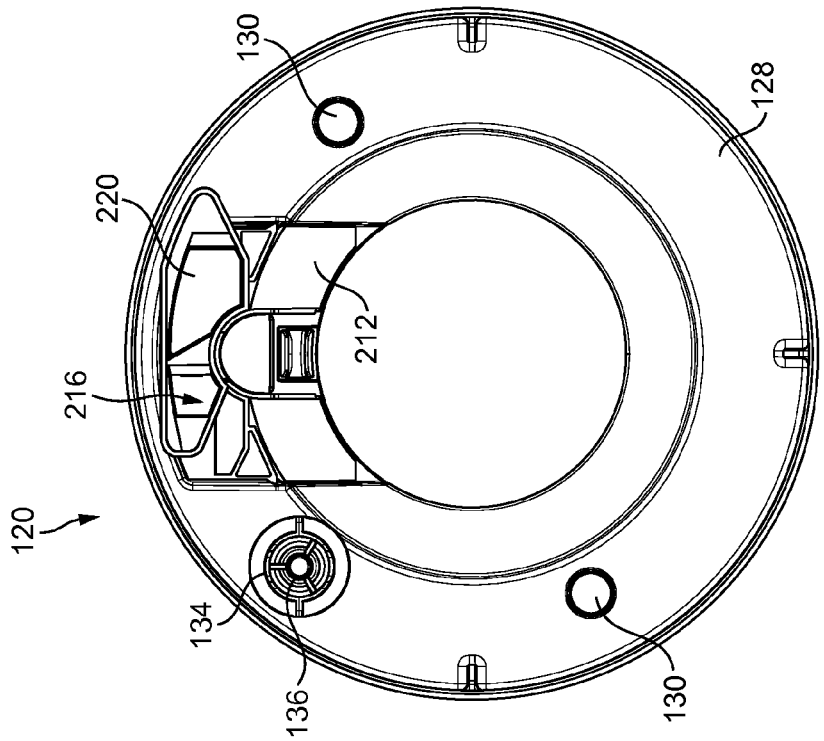
FIG. 8B
FIG. 8A

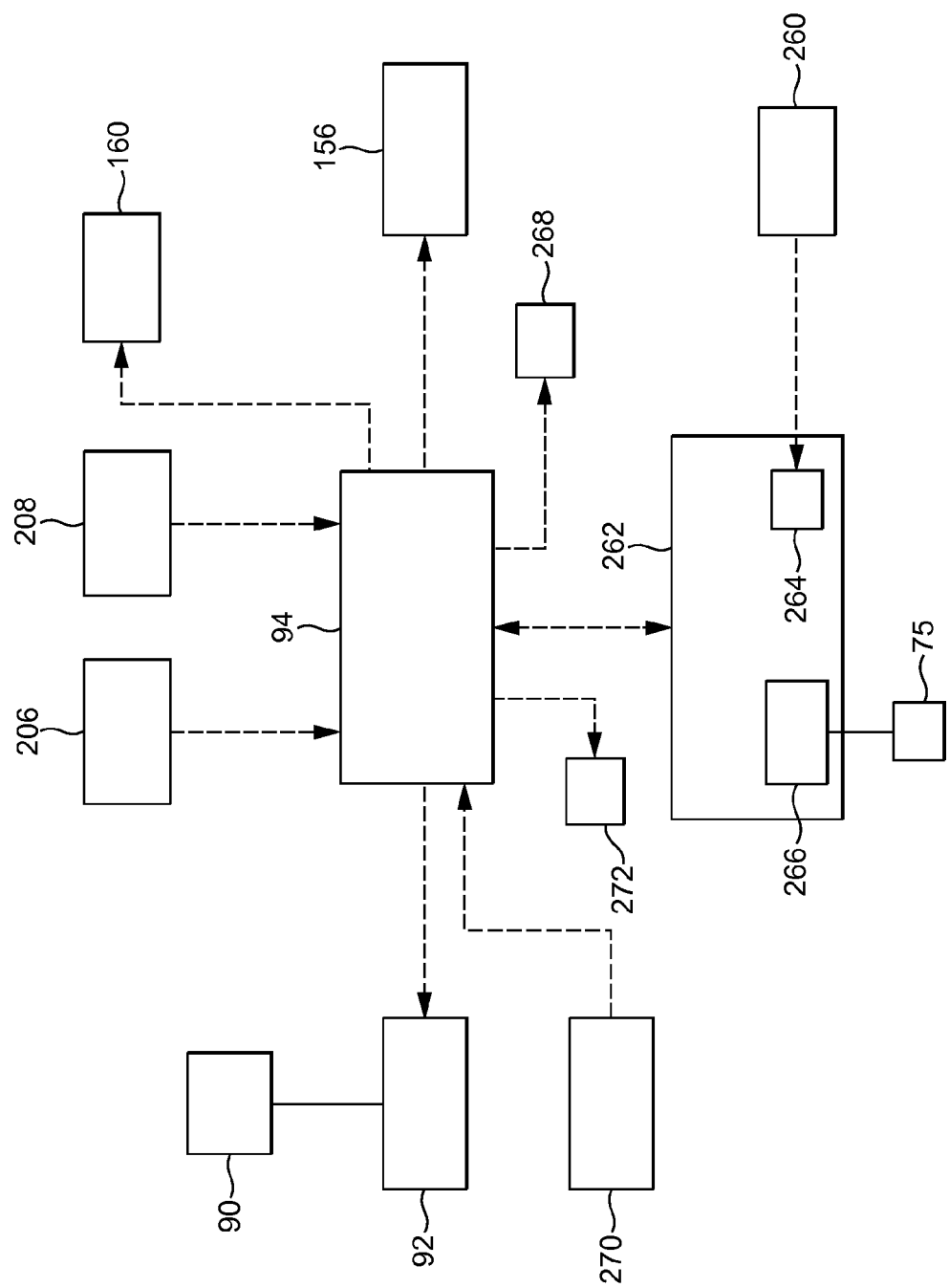

FAN ASSEMBLY

REFERENCE TO RELATED APPLICATIONS

This application claims the priority of United Kingdom Application No. 1317098.0, filed Sep. 26, 2013, the entire contents of which are incorporated herein by reference.

FIELD OF THE INVENTION

The present invention relates to a fan assembly. In a preferred embodiment, the present invention provides a humidifying apparatus for generating a flow of moist air and a flow of air for dispersing the moist air within a domestic environment, such as a room, office or the like.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of a heater or a high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

It is known to provide a ultraviolet (UV) lamp or other UV radiation generator to sterilize water that is conveyed to the atomizing device. For example, U.S. Pat. No. 5,859,952 describes a humidifier in which the water supplied from a tank is conveyed through a sterilizing chamber before being conveyed by a pipe to a chamber containing an ultrasonic atomizer. The sterilizing chamber has a UV transparent window beneath which a UV lamp is located to irradiate water as it passes through the sterilizing chamber. U.S. Pat. No. 7,540,474 describes a humidifier in which the water tank includes a UV transparent tube for conveying water to an outlet of the tank, and a main body upon which the tank is mounted includes a UV lamp which irradiates water as it passes through the tube to the outlet.

SUMMARY OF THE INVENTION

The present invention provides humidifying apparatus comprising a body comprising a chamber, a water tank for supplying water to the chamber, air flow generating means for generating an air flow over water stored in the chamber, humidifying means for humidifying the air flow with water from the chamber, a cartridge removably locatable within the body, the cartridge comprising an ultraviolet radiation emitting lamp for irradiating water in the chamber, the chamber comprising an ultraviolet radiation transparent tube for receiving the lamp, and at least one air outlet for emitting the air flow, wherein the body comprises a plurality of supports for supporting the cartridge therebetween, each support comprising a curved track for guiding movement of the cartridge towards to the tube, the tracks being shaped to orient the cartridge for insertion of the lamp into the tube as the cartridge moves along the tracks towards the tube.

Periodically, the UV lamp may need replacement, for example due to failure of the bulb of the lamp. The present invention can allow the lamp to be replaced in such a way that minimizes the likelihood of damage to the replacement lamp as it is inserted into the body of the apparatus. By providing curved tracks for guiding the movement of the lamp-bearing cartridge towards the tube, the cartridge can be slid along the tracks towards the tube by the user while the shape of the tracks assists in aligning the cartridge with the tube to minimize contact between the lamp and the tube as the lamp is inserted into the tube. Any mis-alignment between the lamp and the tube may be readily identified by the user through an increase in the force required to push the cartridge along the tracks, which can allow the user to quickly rectify the alignment before the lamp or the tube becomes damaged.

The shape of the supports can also allow the location of an aperture through which the cartridge is inserted into the body to be conveniently located for both the user and the manufacturer. For example, rather than having such an aperture located directly in line with the opening of the tube, for example on a side wall of the body, the aperture may be located on a bottom wall of the body, with the supports being curved to change the direction of the movement of the cartridge relative to the support, for example through at least 90°, as it is inserted into the body. This can allow a panel for closing the aperture to kept out of sight during use of the apparatus.

As mentioned above, the cartridge is preferably slidable along the tracks. The cartridge preferably comprises a plurality of runners, with each runner being locatable within a respective track. The runners preferably have a non-circular shape, and preferably have a 2-fold rotational symmetry so that the width of each runner is preferably shorter than its height.

The width of each track preferably varies along the length of the track, and preferably such that the width of each track increases along the length of the track. In the preferred embodiment, the width of each track increases from a first width which is substantially equal to the width of its respective runner, to a second width which is substantially equal to the length of is respective runner. This narrowing of the width of the track at its entrance can ensure that the user inserts the cartridge between the supports at the correct orientation. As the cartridge moves along the track, the increase in the width of each track causes the cartridge to rotate relative to the track through 90° as it moves along the track. As the supports are curved, this has the effect of allowing the cartridge to maintain a substantially constant axial alignment between the tube and the lamp as the cartridge moves along the curved section of the support, which in turn minimizes the internal volume required to accommodate the cartridge as it is pushed towards the tube.

The body preferably comprises a bottom wall defining an aperture through which the cartridge is insertable into the body. Each support is preferably connected to, and preferably is integral with, the bottom wall of the body. Each track preferably extends from the bottom wall of the body towards the chamber. The longitudinal axis of the tube is preferably substantially parallel to the bottom wall of the body.

The body preferably comprises a panel for closing the aperture, with the panel preferably comprising means for urging the cartridge towards a position in which the lamp is inserted fully within the tube. In a preferred embodiment, the panel preferably comprises at least one fin extending therefrom for engaging the cartridge to urge it towards the tube as the panel is returned to a closed position on the body.

The humidifying means preferably comprises a transducer which is removable from the body through the aperture for replacement or cleaning as required.

BRIEF DESCRIPTION OF THE INVENTION

An embodiment of the present invention will now be described, by way of example only, with reference to the accompanying drawings, in which:

FIG. 5A is a top sectional view taken along line A-A in FIG. 2, and FIG. 5B is a close-up of area K indicated in FIG. 5A;

FIG. 8A is a bottom view of a water tank of the humidifying apparatus, and FIG. 8B is a perspective view, from below, of the water tank;

Figure 15A:
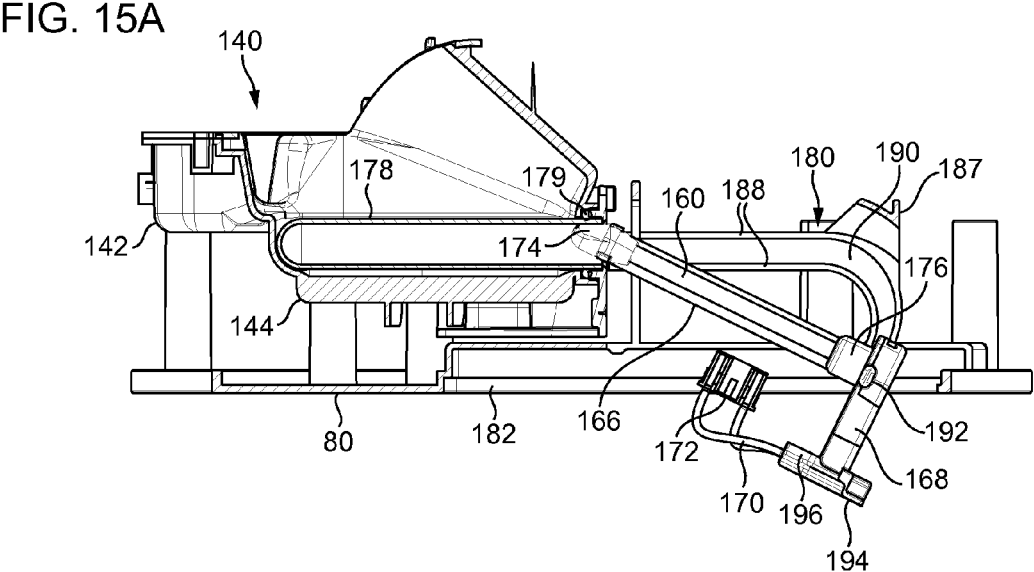
Figure 15B:
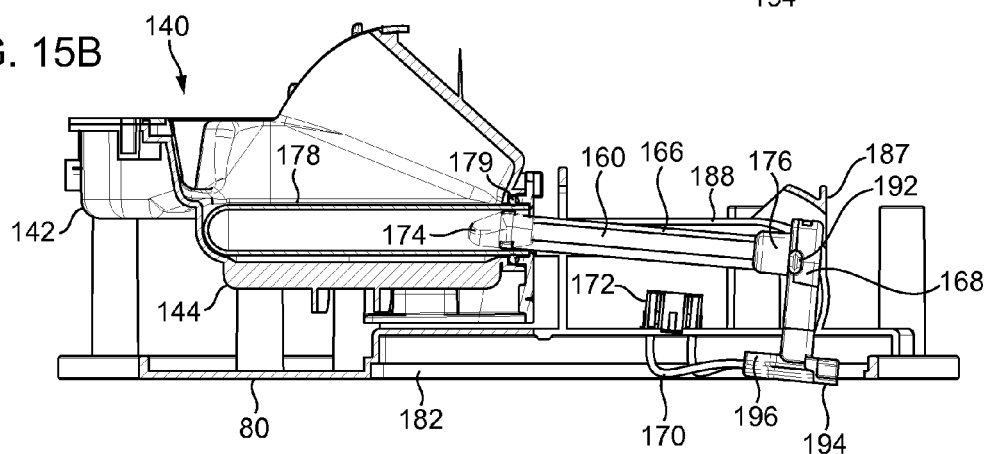
Figure 15C:
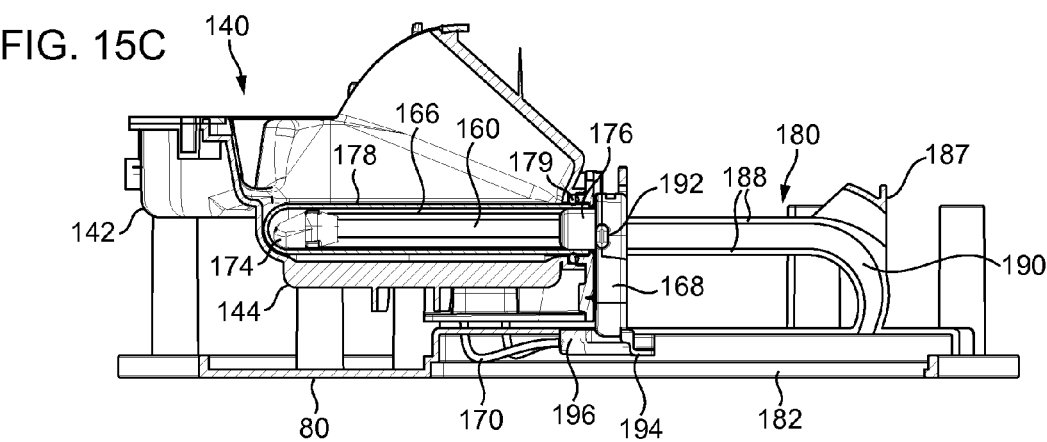

FIG. 15A illustrates the UV lamp assembly in a first partially inserted position relative to sections of the base plate and trough, FIG. 15B illustrates the UV lamp assembly in a second partially inserted position relative to the sections of the base plate and trough, and FIG. 15C illustrates the UV lamp assembly in a fully inserted position relative to the sections of the base plate and trough; and FIG. 16 is a schematic illustration of a control system of the humidifying apparatus.

DETAILED DESCRIPTION OF THE INVENTION

Figure 1:
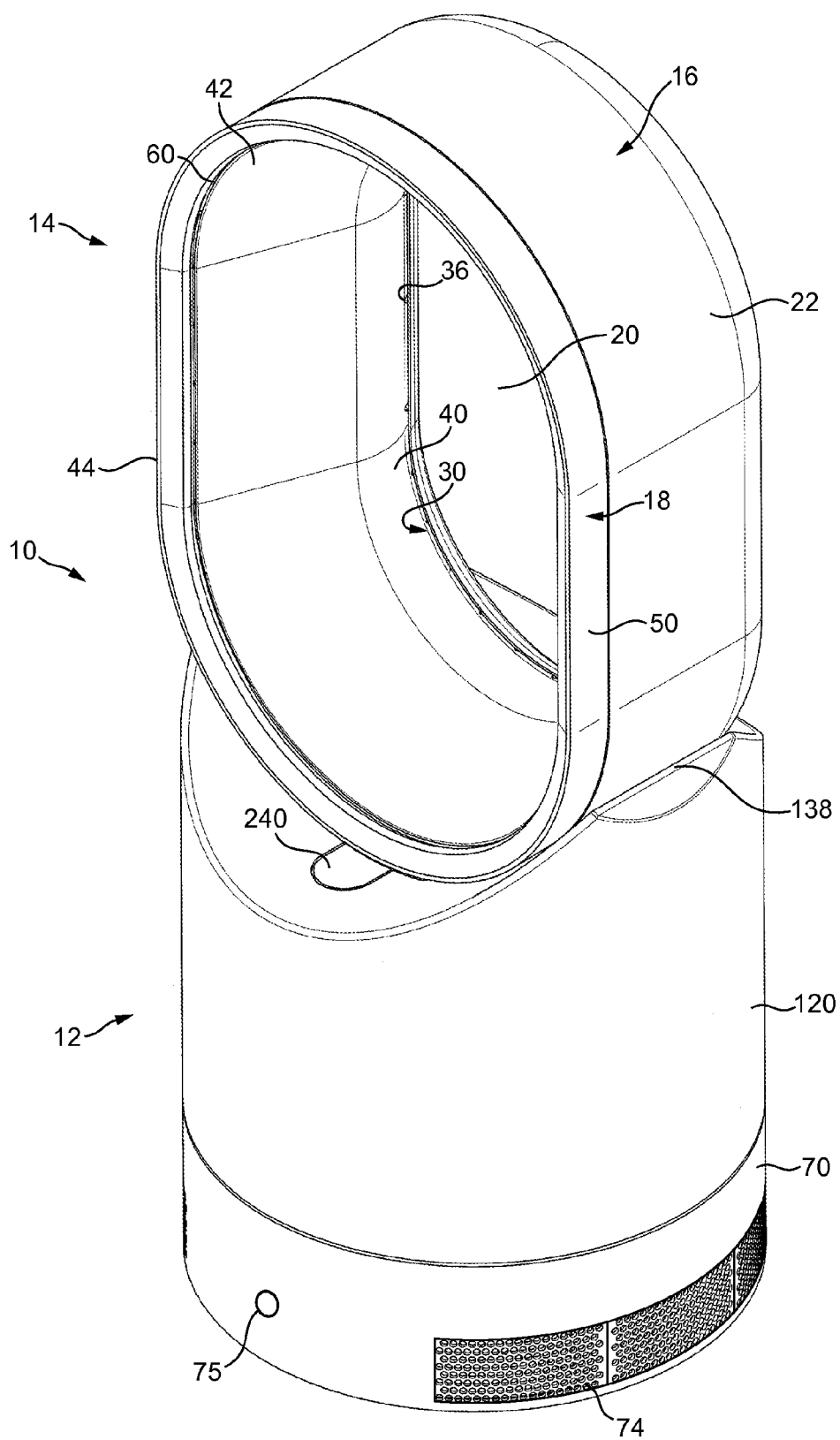
FIG. 1 is a front perspective view of a humidifying apparatus.
Figure 2:
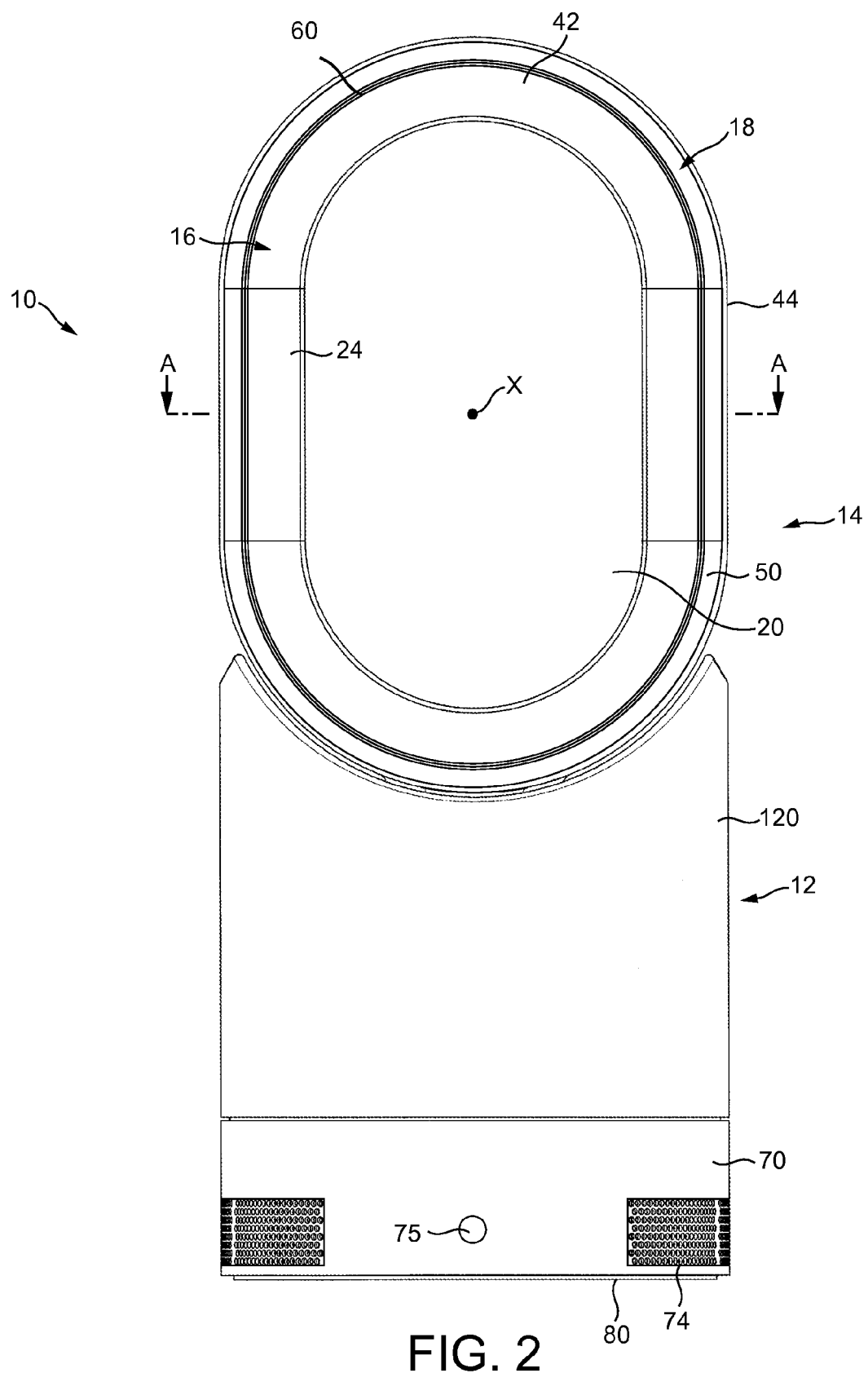
FIG. 2 is a front view of the humidifying apparatus.
Figure 3:
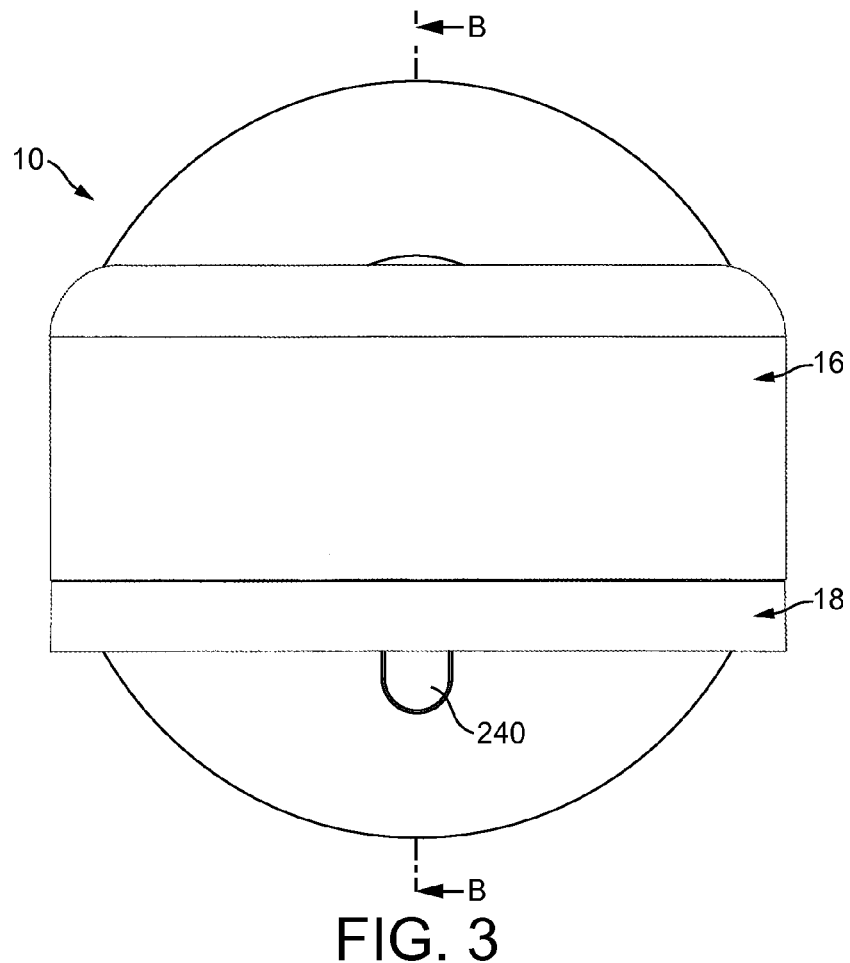
FIG. 3 is a top view of the humidifying apparatus.

FIGS. 1 to 3 are external views of a fan assembly. In this example, the fan assembly is in the form of a humidifying apparatus 10. In overview, the humidifying apparatus 10 comprises a body 12 comprising an air inlet through which air enters the humidifying apparatus 10, and a nozzle 14 in the form of an annular casing mounted on the body 12, and which comprises a plurality of air outlets for emitting air from the humidifying apparatus 10.

The nozzle 14 is arranged to emit two different air flows. The nozzle 14 comprises a rear section 16 and a front section 18 connected to the rear section 16. Each section 16, 18 is annular in shape, and extends about a bore 20 of the nozzle 14. The bore 20 extends centrally through the nozzle 14 so that the centre of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle 14.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

Figure 4:
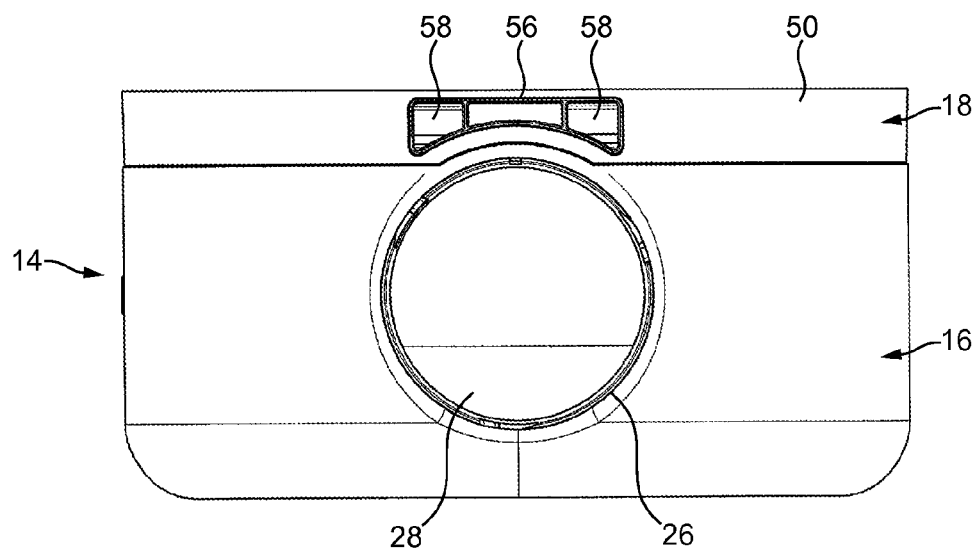
FIG. 4 is a bottom view of a nozzle of the humidifying apparatus.

With reference also to FIGS. 4, 5A and 5B, the rear section 16 of the nozzle 14 comprises an annular outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single moulded part. Each casing section 22, 24 is preferably formed from plastics material. As shown in FIG. 5B, the front part of the inner casing section 24 has an annular outer wall 24a which extends generally parallel to the bore axis X, a front end wall 24b and an annular intermediary wall 24c which extends generally perpendicular to the bore axis X and which joins the outer wall 24a to the end wall 24b so that the end wall 24b protrudes forwardly beyond the intermediary wall 24c. During assembly, the external surface of the outer wall 24a is connected to the internal surface of the front end of the outer casing section 22, for example using an adhesive.

The outer casing section 22 comprises a tubular base 26 which defines a first air inlet 28 of the nozzle 14. The outer casing section 22 and the inner casing section 24 together define a first air outlet 30 of the nozzle 14. As described in more detail below, the first air flow enters the nozzle 14 through the first air inlet 28, and is emitted from the first air outlet 30. The first air outlet 30 is defined by overlapping, or facing, portions of the internal surface 32 of the outer casing section 22 and the external surface 34 of the inner casing section 24. The first air outlet 30 is in the form of a slot. The slot has a relatively constant width in the range from 0.5 to 5 mm. In this example the first air outlet has a width of around 1 mm. Spacers 36 may be spaced about the first air outlet 30 for urging apart the overlapping portions of the outer casing section 22 and the inner casing section 24 to control the width of the first air outlet 30. These spacers may be integral with either of the casing sections 22, 24.

Figure 9:
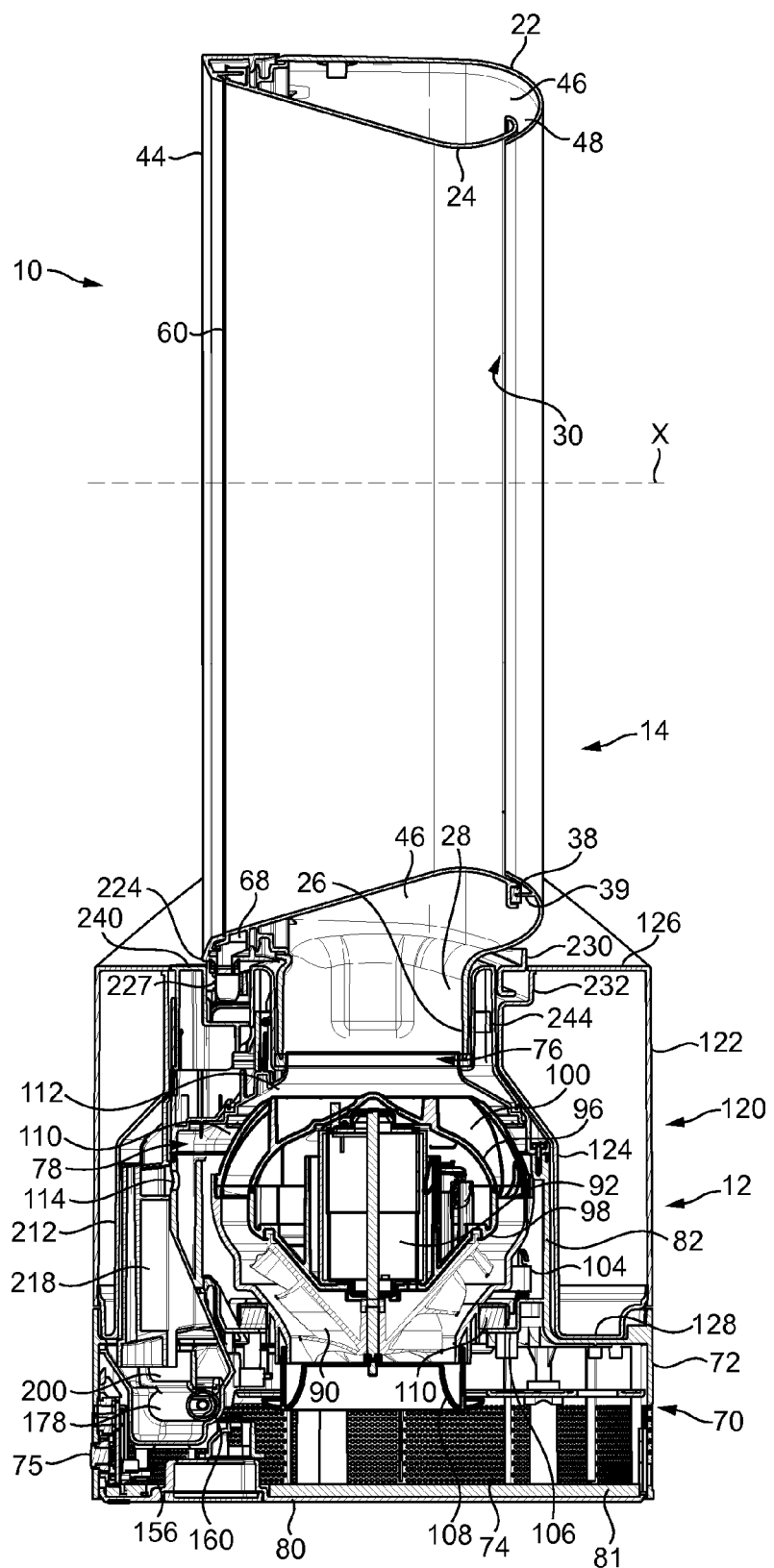
FIG. 9 is a side sectional view taken along line B-B in FIG. 3.
Figure 10A:
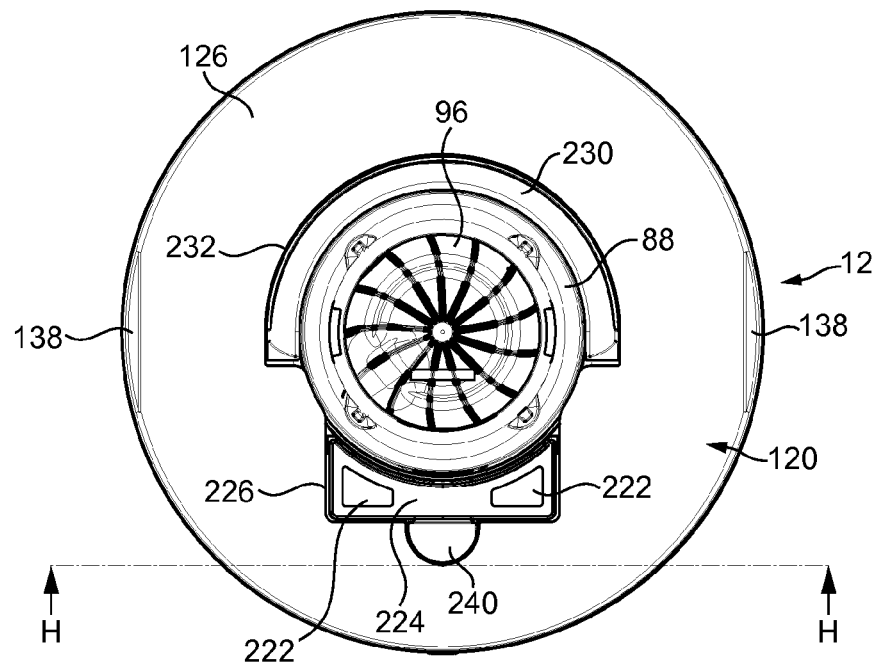
FIG. 10A is top view of the water tank mounted on the base.
Figure 10B:
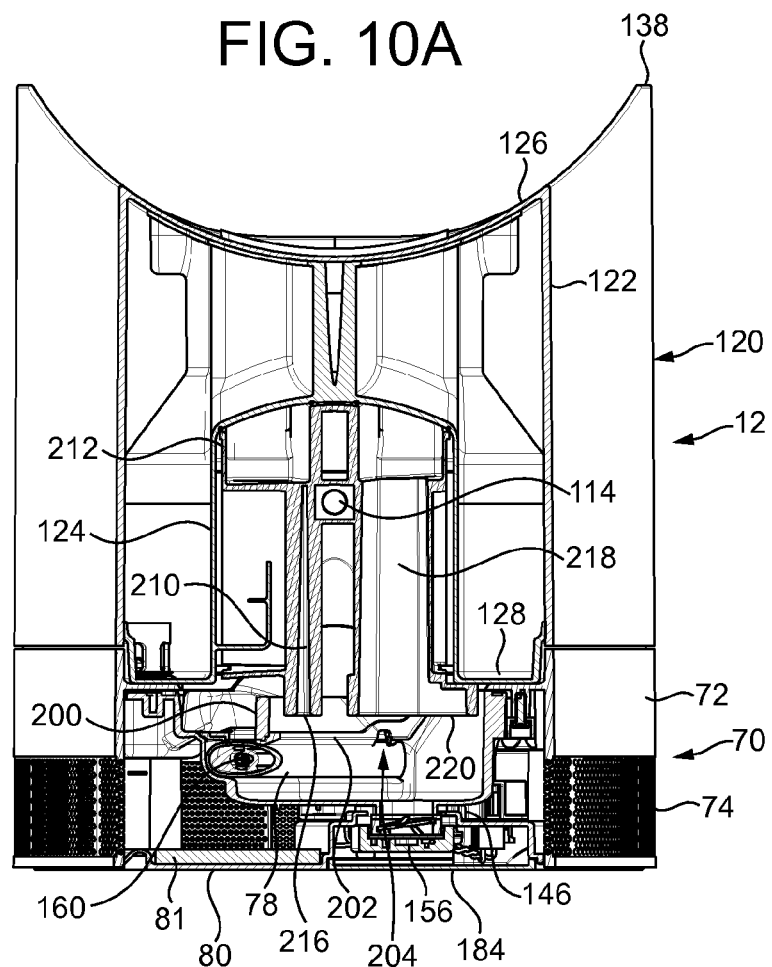
FIG. 10B is a front sectional view taken along line H-H in FIG. 10A.
Figure 11B:
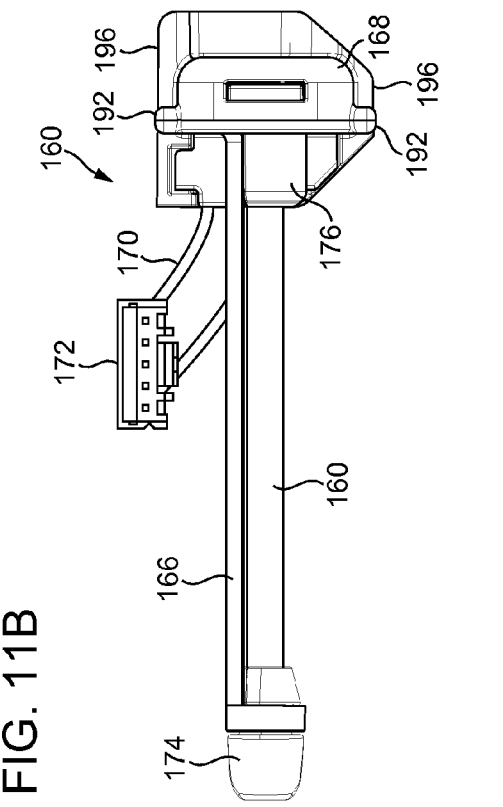
FIG. 11B is a top view of the UV lamp assembly.
Figure 11D:
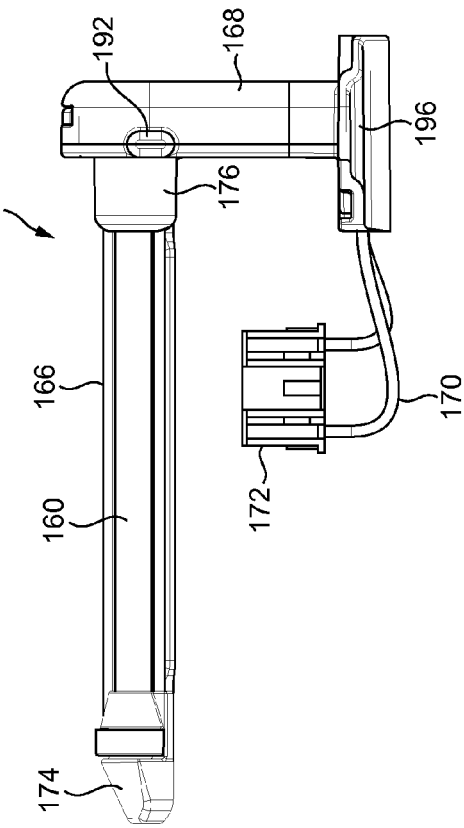
FIG. 11D is a side view of the UV lamp assembly.
Figure 11A:
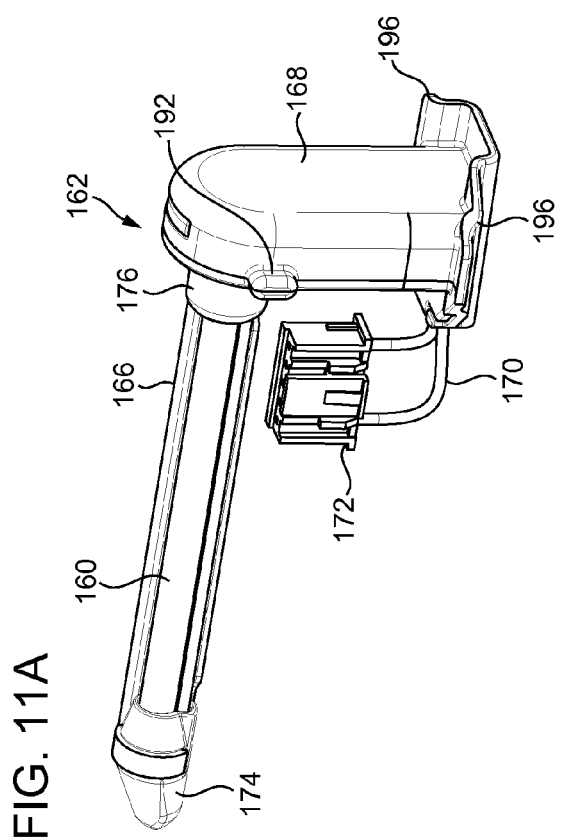
FIG. 11A is a rear perspective view of a UV lamp assembly of the base.
Figure 11C:
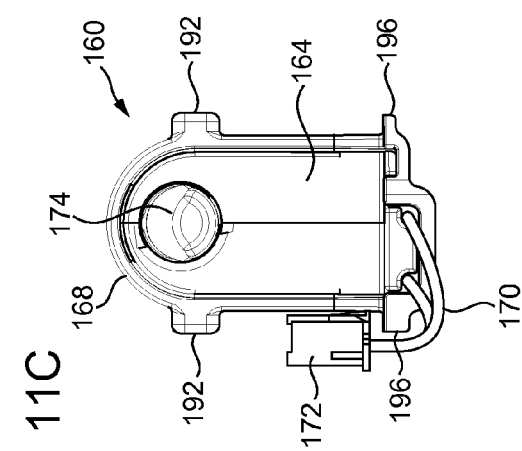
FIG. 11C is a front view of the UV lamp assembly.

In this embodiment, the first air outlet 30 extends partially about the bore 20. The first air outlet 30 extends along the curved upper section and the straight sections of the nozzle 14. However, the first air outlet 30 may extend fully about the bore 20. As shown in FIG. 9, the nozzle 14 includes a sealing member 38 for inhibiting the emission of the first air flow from the curved lower section of the nozzle 14. In this embodiment, the sealing member 38 is generally U-shaped, and is retained by a recess formed in the rear end of the inner casing section 24 so as to lie in a plane which is substantially perpendicular to the axis X. The sealing member 38 engages a U-shaped protrusion 39 extending forwardly from the rear end of the curved lower section of the outer casing section 22 to form a seal therewith.

The first air outlet 30 is arranged to emit air through a front part of the bore 20 of the nozzle 14. The first air outlet 30 is shaped to direct air over an external surface of the nozzle 14. In this embodiment, the external surface 34 of the inner casing section 24 comprises a Coanda surface 40 over which the first air outlet 30 is arranged to direct the first air flow. The Coanda surface 40 is annular, and thus is continuous about the central axis X. The external surface 34 of the inner casing section 24 also includes a diffuser portion 42 which tapers away from the axis X in a direction extending from the first air outlet 30 to the front end 44 of the nozzle 14.

The casing sections 22, 24 together define an annular first interior passage 46 for conveying the first air flow from the first air inlet 28 to the first air outlet 30. The first interior passage 46 is defined by the internal surface of the outer casing section 22 and the internal surface of the inner casing section 24. A tapering, annular mouth 48 of the rear section 16 of the nozzle 14 guides the first air flow to the first air outlet 30. The first air flow path through the nozzle 14 may therefore be considered to be formed from the first air inlet 28, the first interior passage 46, the mouth 48 and the first air outlet 30.

The front section 18 of the nozzle 14 comprises an annular front casing section 50. The front casing section 50 extends about the bore axis X, and has a "racetrack" shape which is similar to that of the other casing sections 22, 24 of the nozzle 14. Similar to the casing sections 22, 24, the front casing section 50 may be formed from a plurality of connected parts, but in this embodiment the front casing section 50 is formed from a single moulded part. The front casing section 50 is preferably formed from plastics material.

The front casing section 50 comprises an annular outer wall 50a which extends generally parallel to the bore axis X, an annular inner wall and an annular front wall 50b which connects the outer side wall 50a to the inner wall. The inner wall comprises a front section 50c which extends generally parallel to the front wall 24b of the inner casing section 24, and a rear section 50d which is angled to the front section 50c so that the rear section 50d tapers towards the axis X in a direction extending from the first air outlet 30 to the front end 44 of the nozzle 14. During assembly, the front casing section 50 is attached to the inner casing section 24, for example using a snap-fit connection of the outer side wall 50a of the front casing section 50 to the outer annular wall 24a of the inner casing section 24.

The lower end of the front casing section 50 comprises a tubular base 56. The base 56 defines a plurality of second air inlets 58 of the nozzle 14. In this embodiment, the base 56 comprises two second air inlets 58. Alternatively the base 56 may comprises a single air inlet 58. The front casing section 50 defines with the inner casing section 24 a second air outlet 60 of the nozzle 14. In this example, the second air outlet 60 extends partially about the bore 20, along the curved upper section and the straight sections of the nozzle 14. Alternatively, the second air outlet 60 may extend fully about the bore 20. The second air outlet 60 is in the form of a slot having a relatively constant width in the range from 0.5 to 5 mm. In this example the second air outlet 60 has a width of around 1 mm. The second air outlet 60 is located between the internal surface of the end wall 24b of the inner casing section 24 and the external surface of the rear section 50d of the inner wall of the front casing section 50. Spacers 62 may be spaced along the second air outlet 60 to urge apart the overlapping portions of the inner casing section 24 and the front casing section 50 to control the width of the second air outlet 60. These spacers may be integral with either of the casing sections 24, 50.

The second air outlet 60 is configured to emit the second air flow over the external surface of the rear section 50d of the inner wall of the front casing section 50. This surface thus provides a Coanda surface over which each second air outlet 60 is arranged to direct a respective portion of the second air flow. This Coanda surface is also continuous about the axis X, but as the air outlet 60 only extends about part of the bore 20 this Coanda surface may similarly extend about part of the bore 20. The external surface of the front section 50c of the front casing section 50 provides a diffuser portion which tapers away from the axis X in a direction extending from the second air outlet 60 to the front end 44 of the nozzle 14.

The casing sections 24, 50 together define an annular second interior passage 68 for conveying the second air flow from the second air inlets 58 to the second air outlet 60. The second interior passage 68 is defined by the internal surfaces of the inner casing section 24 and the front casing section 50. The second air flow path through the nozzle 14 may therefore be considered to be formed by the second air inlets 58, the interior passage 68 and the second air outlet 60.

Figure 6:
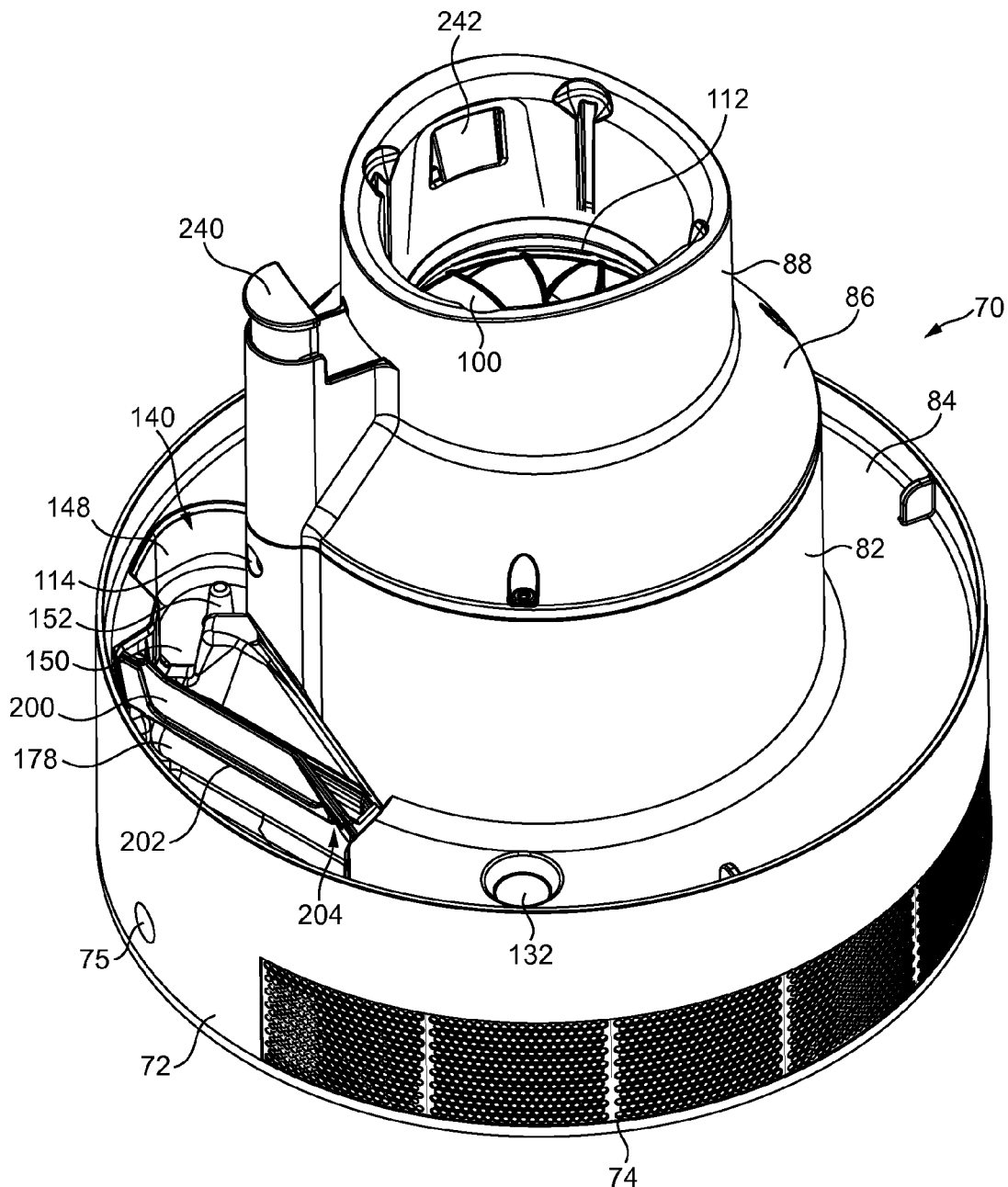
FIG. 6 is a perspective view, from above, of the base of the humidifying apparatus.
Figure 7:
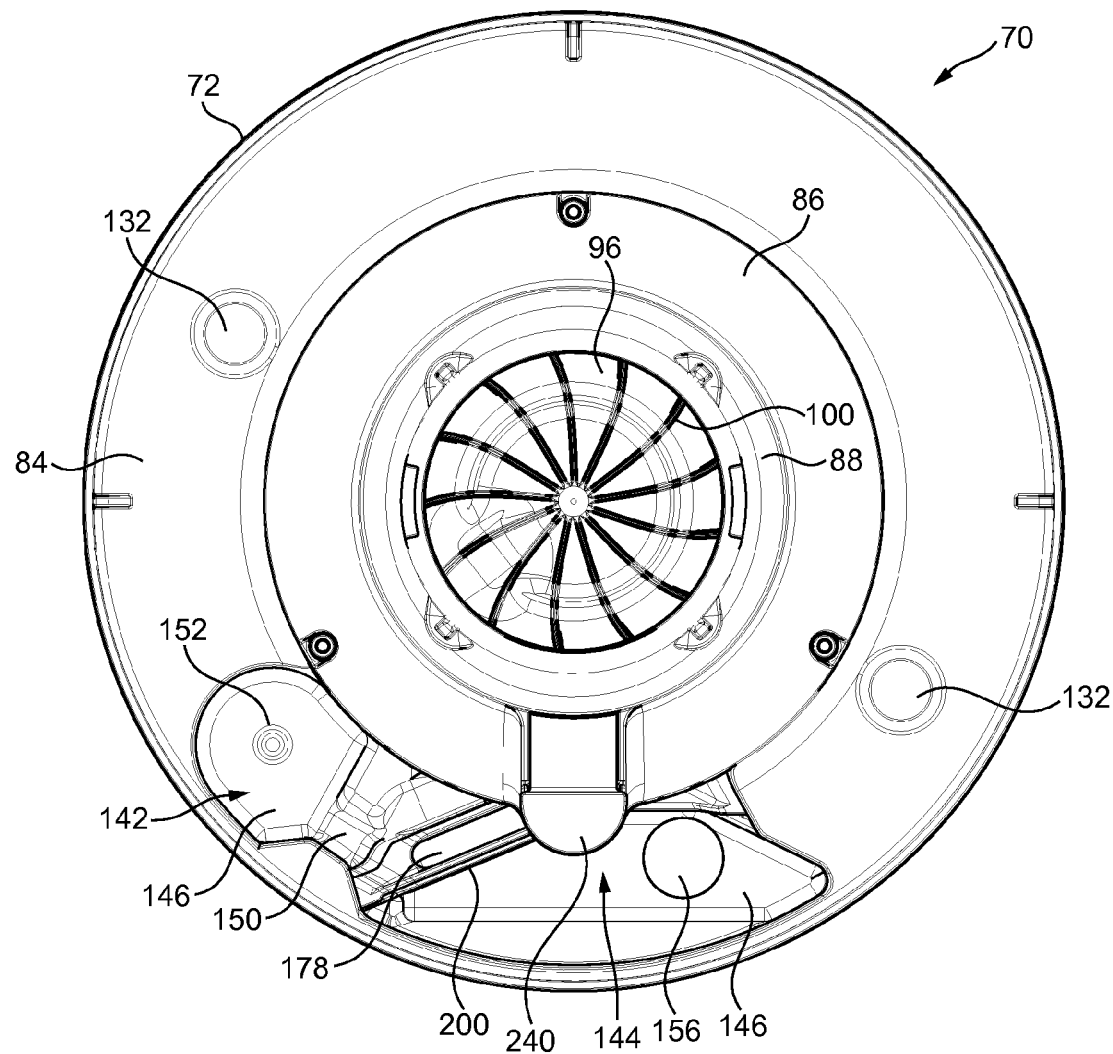
FIG. 7 is a top view of the base.

Returning to FIGS. 1 to 3, the body 12 is generally cylindrical in shape. The body 12 comprises a base 70. FIGS. 6 and 7 are external views of the base 70. The base 70 has an external outer wall 72 which is cylindrical in shape, and which comprises an air inlet 74. In this example, the air inlet 74 comprises a plurality of apertures formed in the outer wall 72 of the base 70. A front portion of the base 70 may comprise a user interface of the humidifying apparatus 10. The user interface is illustrated schematically in FIG. 16, and is described in more detail below, and comprises at least one user actuable switch or button 75. A mains power cable (not shown) for supplying electrical power to the humidifying apparatus 10 extends through an aperture formed in the base 70.

With reference also to FIG. 9, the base 70 comprises a first air passageway 76 for conveying a first air flow to the first air flow path through the nozzle 14, and a second air passageway 78 for conveying a second air flow to the second air flow path through the nozzle 14. The first air passageway 76 passes through the base 70 from the air inlet 74 to the first air inlet 28 of the nozzle 14. The base 70 comprises a bottom wall 80 connected to the lower end of the outer wall 72. A sheet 81 of silencing foam is located on the upper surface of the bottom wall 80. A tubular central wall 82, having a smaller diameter than the outer wall 72, is connected to the outer wall 72 by an arcuate supporting wall 84. The central wall 82 is substantially co-axial with the outer wall 72. The supporting wall 84 is located above, and generally parallel to, the bottom wall 80. The supporting wall 84 extends partially about the central wall 82 to define an opening for exposing a water reservoir 140 of the base 70, as described in more detail below. The central wall 82 extends upwardly away from the supporting wall 84. In this example, the outer wall 72, central wall 82 and supporting wall 84 are formed as a single component of the base 70, but alternatively two or more of these walls may be formed as a respective component of the base 70. An upper wall of the base 70 is connected to the upper end of the central wall 82. The upper wall has a lower frusto-conical section 86 and an upper cylindrical section 88 into which the base 26 of the nozzle 14 is inserted.

The central wall 82 extends about an impeller 90 for generating a first air flow through the first air passageway 76. In this example the impeller 90 is in the form of a mixed flow impeller. The impeller 90 is connected to a rotary shaft extending outwardly from a motor 92 for driving the impeller 90. In this embodiment, the motor 92 is a DC brushless motor having a speed which is variable by a drive circuit 94 in response to a speed selection by a user. In FIG. 16, the drive circuit 94 is illustrated as a single component, but the drive circuit 94 may be formed from a number of physically separate, but electrically connected, sub-circuits, each comprising a respective processor for controlling various different components or functions of the humidifying apparatus 10. The maximum speed of the motor 92 is preferably in the range from 5,000 to 10,000 rpm. The motor 92 is housed within a motor bucket comprising a domed upper portion 96 connected to a lower portion 98. A set of guide vanes 100 is connected to the upper surface of the upper portion 96 of the motor bucket to guide air towards the first air inlet 28 of the nozzle 14.

The motor bucket is located within, and mounted on, a generally frusto-conical impeller housing 104. The impeller housing 104 is, in turn, mounted on an annular platform 106 extending inwardly from the central wall 82. An annular inlet member 108 is connected to the bottom of the impeller housing 104 for guiding the air flow into the impeller housing 104. An annular sealing member 110 is located between the impeller housing 104 and the platform 106 to prevent air from passing around the outer surface of the impeller housing 104 to the inlet member 108. The platform 106 preferably comprises a guide portion for guiding an electrical cable from the drive circuit 94 to the motor 92.

The first air passageway 76 extends from the air inlet 74 to the inlet member 108. From the inlet member 108, the first air passageway 76 extends, in turn, through the impeller housing 104, the upper end of the central wall 82 and the sections 86, 88 of the upper wall.

The second air passageway 78 is arranged to receive air from the first air passageway 76. The second air passageway 78 is located adjacent to the first air passageway 76. The second air passageway 78 comprises a duct 110 for receiving air from the first air passageway 76. The duct 110 is defined by the central wall 82 of the base 70. The duct 110 is located adjacent to, and in this example radially external of, part of the first air passageway 76. The duct 110 has an inlet port 112 located downstream from the guide vanes 100 so as to receive part of the air flow emitted from the guide vanes 100, and which forms the second air flow. The duct 110 has an outlet port 114 located on the central wall 82 of the base 70.

The humidifying apparatus 10 is configured to increase the humidity of the second air flow before it enters the nozzle 14. With reference now to FIGS. 1, 2, and 8A to 10B, the humidifying apparatus 10 comprises a water tank 120 removably mountable on the base 70 of the body 12. The water tank 120 has a cylindrical outer wall 122 which has the same radius as the outer wall 72 of the base 70 of the body 12 so that the body 12 has a cylindrical appearance when the water tank 120 is mounted on the base 70. The water tank 120 has a tubular inner wall 124 which surrounds the walls 82, 86, 88 of the base 70 when the water tank 120 is mounted on the base 70. The outer wall 122 and the inner wall 124 define, with an annular upper wall 126 and an annular lower wall 128 of the water tank 120, an annular volume for storing water. The water tank 120 thus surrounds the impeller 90 and the motor 92, and so at least part of the first air passageway 76, when the water tank 120 is mounted on the base 70. The lower wall 128 of the water tank 120 engages, and is supported by, the supporting wall 84 of the base 70 when the water tank 120 is mounted on the base 70. Protrusions 130 may be formed on, or mounted on, the lower wall 128 for location within recesses 132 formed on the supporting wall 84 of the base 70 to ensure accurate angular positioning of the water tank 120 on the base 70. The protrusions 130 may be in the form of magnets which interact with other magnets (not shown) mounted beneath the recesses 132 on the lower surface of the supporting wall 84 to assist with the accurate location of the water tank 120 on the base 70, and to increase the force required to move the water tank 120 relative to the base 70. This can reduce the risk of accidental movement of the water tank 120 relative to the base 70.

The water tank 120 preferably has a capacity in the range from 2 to 4 litres. With particular reference to FIGS. 8A and 8B, a spout 134 is removably connected to the lower wall 128 of the water tank 120, for example through co-operating threaded connections. In this example the water tank 120 is filled by removing the water tank 120 from the base 70 and inverting the water tank 120 so that the spout 134 is projecting upwardly. The spout 134 is then unscrewed from the water tank 120 and water is introduced into the water tank 120 through an aperture exposed when the spout 134 is disconnected from the water tank 120. The spout 134 preferably comprises a plurality of radial fins for facilitating the gripping and twisting of the spout 134 relative to the water tank 120. Once the water tank 120 has been filled, the user reconnects the spout 134 to the water tank 120, returns the water tank 120 to its non-inverted orientation and replaces the water tank 120 on the base 70. A spring-loaded valve 136 is located within the spout 134 for preventing leakage of water through a water outlet of the spout 134 when the water tank 120 is re-inverted. The valve 136 is biased towards a position in which a skirt of the valve 136 engages the upper surface of the spout 134 to prevent water entering the spout 134 from the water tank 120.

The upper wall 126 of the water tank 120 comprises one or more supports 138 for supporting the inverted water tank 120 on a work surface, counter top or other support surface. In this example, two parallel supports 138 are formed in the periphery of the upper wall 126 for supporting the inverted water tank 120.

With reference now to FIGS. 6, 7 and 9 to 10B, the base 70 comprises a water reservoir 140 for receiving water from the water tank 120. The water reservoir 140 is a separate component which is mounted on the bottom wall 80 of the base 70, and which is exposed by the opening formed in the supporting wall 84 of the base 70. The water reservoir 140 comprises an inlet chamber 142 for receiving water from the water tank 120, and an outlet chamber 144 for receiving water from the inlet chamber 142, and in which water is atomised to become entrained within the second air flow. The inlet chamber 142 is located on one side of the water reservoir 140, and the outlet chamber 144 is located on the other side of the water reservoir 140. The water reservoir 140 comprises a base 146 and a side wall 148 extending about and upstanding from the periphery of the base 146. The base 146 is shaped so that the depth of the outlet chamber 144 is greater than the depth of the inlet chamber 142. The sections of the base 146 located within each chamber 142, 164 are preferably substantially parallel, and are preferably parallel to the bottom wall 80 of the base 70 so that these sections of the base 146 are substantially horizontal when the humidifying apparatus 10 is located on a horizontal support surface. A channel 150 formed in the water reservoir 140 allows water to pass from the inlet chamber 142 to the outlet chamber 144.

A pin 152 extends upwardly from the section of the base 146 forming, in part, the inlet chamber 142. When the water tank 120 is mounted on the base 70, the pin 152 protrudes into the spout 134 to push the valve 136 upwardly to open the spout 134, thereby allowing water to pass under gravity into the inlet chamber 142. As the inlet chamber 142 fills with water, water passes through the channel 150 to enter the outlet chamber 144. As water is output from the water tank 120, it is replaced within the water tank 120 by air which enters the water tank 120 through slots 154 located in the side wall of the spout 134. As the chambers 142, 144 fill with water, the level of water within the chambers 142, 144 equalizes. The spout 134 is arranged so that the water reservoir 140 can be filled with water to a maximum level which is substantially coplanar with the upper end of the slots 154 located within the side wall of the spout 134; above that level no air can enter the water tank 120 to replace water output from the water tank 120.

The section of the base 146 forming, in part, the outlet chamber 144 comprises a circular aperture for exposing a piezoelectric transducer 156. The drive circuit 94 is configured to actuate vibration of the transducer 156 in an atomization mode to atomise water located in the outlet chamber 144. In the atomization mode, the transducer 156 may vibrate ultrasonically at a frequency $f_1$, which may be in the range from 1 to 2 MHz. The transducer 156 forms part of a piezoelectric transducer assembly which is connected to the lower side of the bottom wall 80 of the base 70 so as to protrude through an aperture 157, illustrated in FIG. 14, formed in the bottom wall 80 of the base 70.

The water reservoir 140 also includes an ultraviolet radiation (UV) generator for irradiating water within the water reservoir 140. In this embodiment, the UV generator is arranged to irradiate water within the outlet chamber 144 of the water reservoir 140. In this embodiment, the UV generator comprises a UV lamp 160, which forms part of a UV lamp assembly 162 of the base 70. The UV lamp assembly 162 is illustrated in FIGS. 11A to 11D. The UV lamp assembly 162 is in the form of a cartridge which is removably insertable into the base 70 to allow the UV lamp assembly 162 to be replaced by a user as required. The UV lamp assembly 162 comprises a body section 164 and an arm section 166 extending from the body section 164. The arm section 166 has a concave cross-section and extends partially about the UV lamp 160. The concave surface of the arm section 166 may be formed from, or have a coating formed from, reflective material to reflect UV radiation emitted from the UV lamp 160 towards the outlet chamber 144 of the water reservoir 140. In this embodiment, a cover 168 is provided around the body section 164 to define features which enable the UV lamp assembly 162 to be supported by the base 70. While in this embodiment the cover 168 is a separate component which is connected to the body section 164, for example using a snap-fit connection, during assembly, alternatively the features of the cover 168 may be provided by the body section 164 of the UV lamp assembly 162. A loom 170 connects the UV lamp 160 to a connector 172 for connecting the UV lamp 160 to the drive circuit 94. Grommets 174, 176 provided at opposite ends of the UV lamp 160 extend around electrical contacts between the UV lamp 160 and the loom 170, and act to support the UV lamp 160 within the UV lamp assembly 162.

With reference also to FIGS. 6, 7 and 13 to 15C, the water reservoir 140 comprises a UV transparent tube 178. The tube 178 is located within the outlet chamber 144 of the water reservoir 140. As discussed in more detail below, the UV lamp assembly 162 is supported by the base 70 so that the UV lamp 160 is located within the tube 178 when it is inserted fully into the base 70. Preferably, an open end of the tube 178 protrudes through an aperture formed in the side wall 148 of the water reservoir 140 to allow the UV lamp 160 to enter the tube 178. An O-ring sealing member may be provided between the tube 178 and the aperture formed in the side wall 148 to inhibit water leakage through the aperture.

Figure 12:
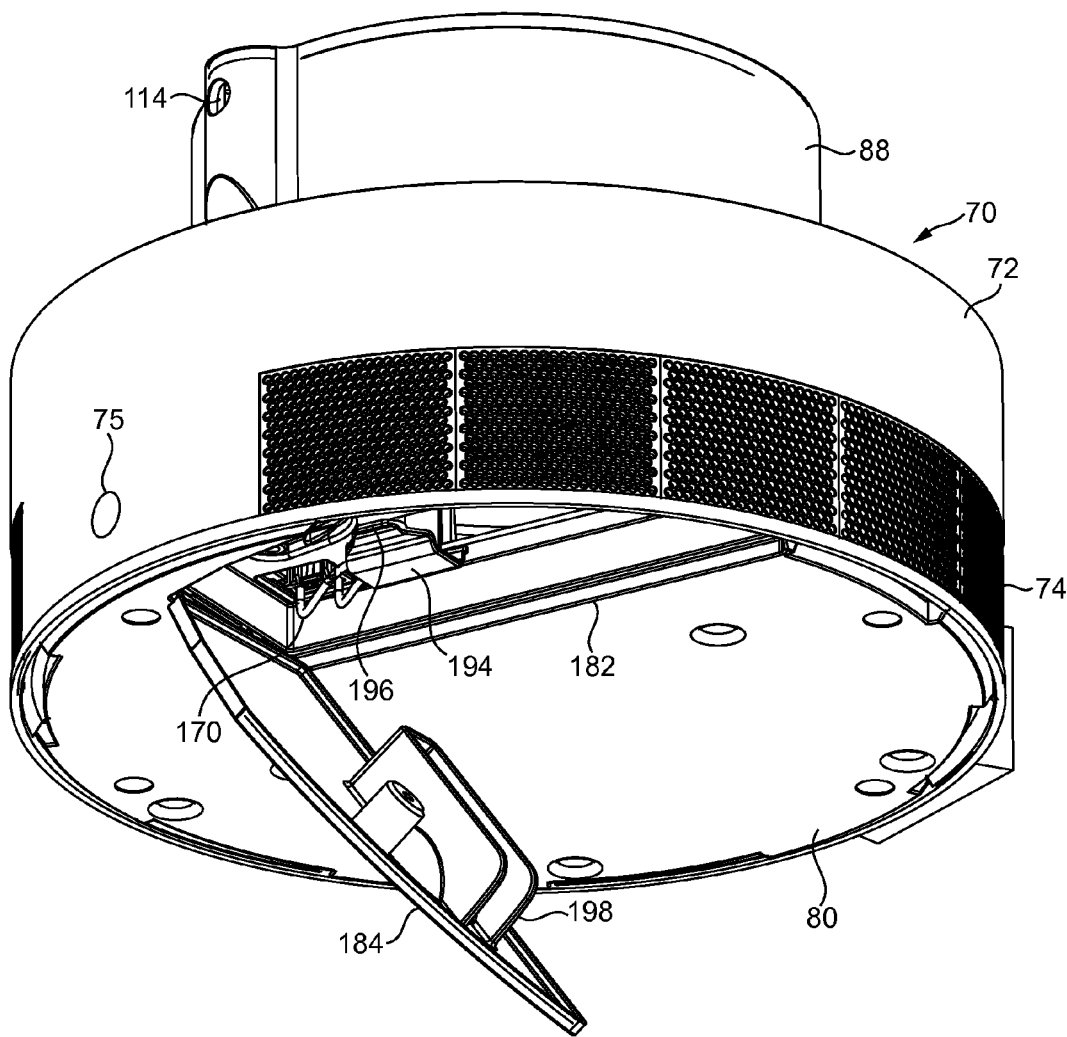
FIG. 12 is a perspective view, from below, of the base, with an access panel partially removed.
Figure 13:
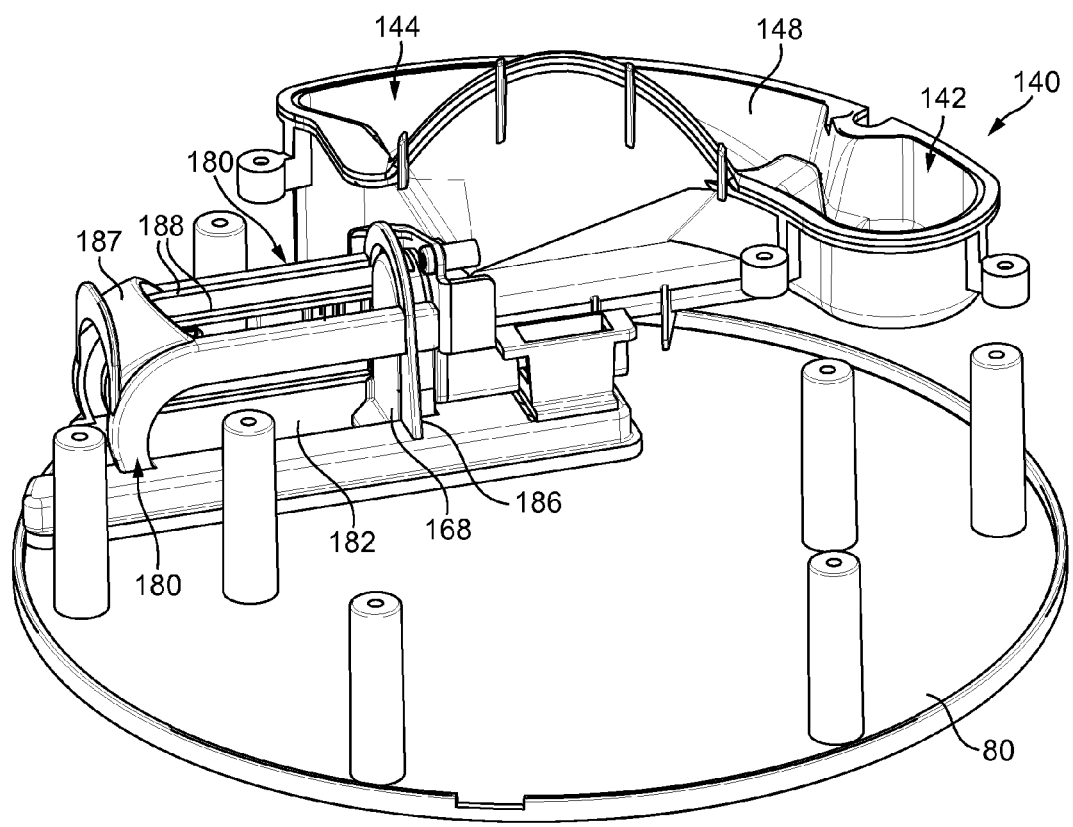
FIG. 13 is a perspective view, from above, of a base plate, trough and the UV lamp assembly of the base.

The base 70 comprises two supports 180 for supporting the UV lamp assembly 162 within the base 70. The supports 180 are connected to, and are preferably integral with, the bottom wall 80 of the base 70. The supports 180 are arranged in parallel, and are located on either side of an aperture 182 through which the UV lamp assembly 162 is inserted into, and removable from, the base 70. The aperture 182 is normally covered by a panel 184 removably connected to the lower side of the bottom wall 80 of the base 70. By lowering the panel 184, or removing the panel 184 from the bottom wall 80 of the base 70, as shown in FIG. 12, a user is able to access both the UV lamp assembly 162 and the piezoelectric transducer assembly for replacement or repair of each assembly as required.

Each support 180 is curved in shape, and extends upwardly from the upper side of the bottom wall 80 of the base 70 to the water reservoir 140. The upper surfaces of the supports 180 are connected by bridges 186, 187, which are also preferably integral with the bottom wall 80 of the base 70, to provide structural stability to the supports 180.

Each support 180 comprises a set of curved guide rails 188 for guiding movement of the UV lamp assembly 162 as it is inserted into the base 70. Each set of guide rails 188 defines a curved track 190 which extends from the lower surface of the bottom wall 80 of the base 70 to the free ends of the support 180. The cover 168 of the UV lamp assembly 162 comprises a first pair of runners 192 which is each received within a respective track 190 when the UV lamp assembly 162 is inserted into the base 70, and which each slides along a respective track 190 as the UV lamp assembly 162 is inserted into the base 70.

The tracks 190 are shaped to orient the UV lamp assembly 162 for insertion of the UV lamp 160 into the tube 178 as the UV lamp assembly 162 moves along the tracks 190. This minimises the contact between the UV lamp 160 and the tube 178 as the UV lamp assembly 162 is inserted into the base 70, facilitating the insertion of the UV lamp assembly 162 within the base 70 and minimising the risk of the UV lamp 160 being damaged during the insertion of the UV lamp assembly 162 into the base 70.

Figure 14:
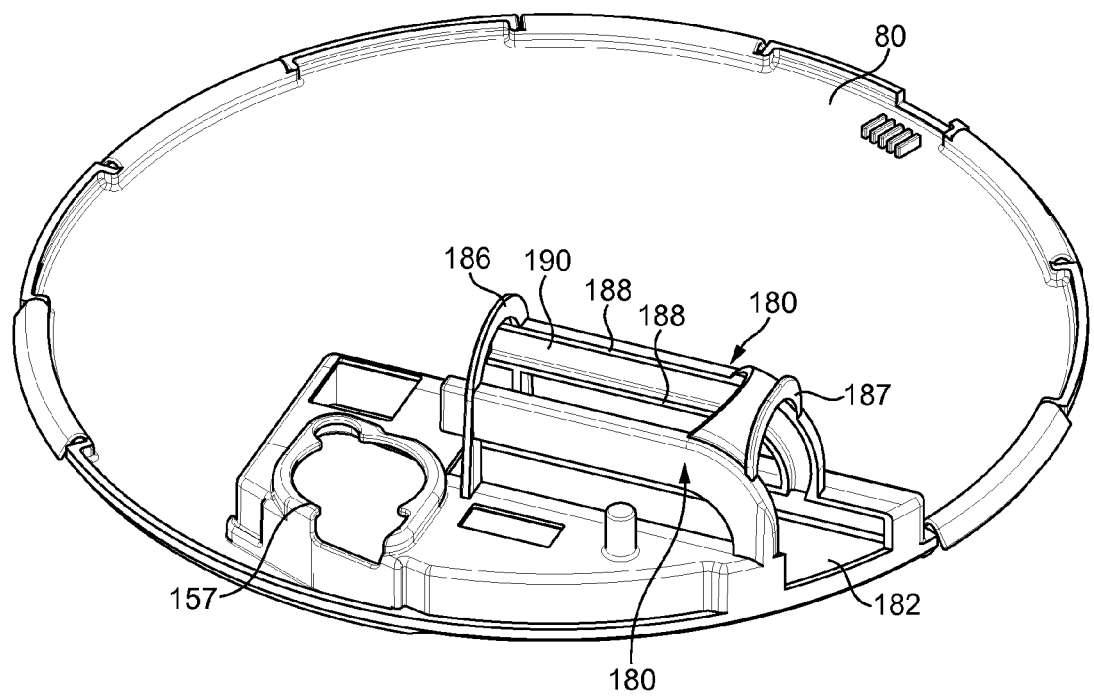
FIG. 14 is a perspective view, from above, of the base plate.

As shown most clearly in FIGS. 14 and 15C, the width of each track 190 varies along the length of the track 190. In this example, the width of each track 190 increases from a first width which is substantially equal to the width of a first runner 192, to a second width which is substantially equal to the length of a first runner 192. As the first runners 192 move along the tracks 190, the orientation of the first runners 192 changes from one in which the first runners 192 are substantially parallel to the rails 188, to one in which the first runners 192 are substantially orthogonal to the rails 188. This minimizes the variation in the angle of the UV lamp 160 relative to the tube 178 as the UV lamp assembly 162 moves along the tracks 190.

To insert the UV lamp assembly 162 within the base 70, the access panel 184 is first lowered, or removed, to expose the aperture 182 through which the UV lamp assembly 162 is inserted into the base 70. The user then positions the UV lamp assembly 162 as illustrated in FIG. 15A so that the grommet 174 is located at least partially within the tube 178 and so that each runner 192 is located at the entrance of a respective track 190. The user then pushes the bottom surface 194 of the cover 168 towards the bottom wall 80 of the base 70, as illustrated in FIG. 15B, until a second pair of runners 196 located on the cover 168 engage the lower surface of the bottom wall 80 of the base 70. This causes the runners 192 to move along the curved portions of the tracks 190 to align the UV lamp 160 with the tube 178. The user then slides the cover 168 along the bottom wall 80 of the base 70 to insert the UV lamp 160 fully within the tube 178, as illustrated in FIG. 15C. Finally, the user connects the connector 172 of the UV lamp assembly 162 to the drive circuit 94, and replaces the panel 184 to cover the aperture 182. Fins 198 located on the panel 184 engage the UV lamp assembly 162 as the panel 184 is replaced on the bottom wall 80 to urge the UV lamp assembly 162 towards its fully inserted position. To remove the UV lamp assembly 162 from the base 70, the user simply reverses the above procedure.

Returning to FIGS. 6, 7 and 9 to 10B, the water reservoir 140 comprises a baffle plate 200 for guiding water entering the outlet chamber 144 along the tube 178. The baffle plate 200 extends across the outlet chamber 144, and serves to divide the outlet chamber 144 into an inlet section for receiving water from the inlet chamber 142, and an outlet section within which water is atomized by the transducer 156. A sealing member 202 extends between the baffle plate 200 and the tube 178. As water enters the outlet chamber 144, it is guided by the baffle plate 200 to flow along an upper portion of the tube 178. A notch formed in the sealing member 202 defines with the tube 178 an aperture 204 through which water flows into the outlet section of the outlet chamber 144.

The upper edge of the baffle plate 200 is located above the maximum water level of the water reservoir 140. A level sensor 206 (illustrated schematically in FIG. 16) is located within the water reservoir 140 for detecting the level of water within the water reservoir 140. Alternatively, the level sensor 206 may be located in the water tank 120.

The base 70 may also include a proximity sensor 208 for detecting that the water tank 120 has been mounted on the base 70. The proximity sensor 208 may be in the form of a Hall effect sensor which interacts with a magnet (not shown) located on the lower wall 128 of the water tank 120 to detect the presence, or absence, of the water tank 120 on the base 70.

The water tank 120 defines an inlet duct 210 for receiving the second air flow from the outlet port 114. In this embodiment, the inlet duct 210 is defined by a detachable section 212 of the water tank 120, which is detachably connected to the inner wall 124 of the water tank 120. The inlet duct 210 comprises an inlet port 214 which faces the outlet port 114 of the duct 110 of the base 70 when the water tank 120 is located on the base 70, and an outlet port 216 which is located above the outlet section of the outlet chamber 144 of the water reservoir 140. The maximum water level of the water reservoir 140 is preferably selected so that the outlet port 216 lies above this maximum water level. As a result, the second air flow enters the water reservoir 140 directly over the surface of the water located in the outlet chamber 144 of the water reservoir 140. The detachable section 212 of the water tank 120 also defines, with the inner wall 124 of the water tank 120, an outlet duct 218 for conveying the second air flow from the water reservoir 140 to the second air inlets 58 of the nozzle 14. The outlet duct 218 comprises an inlet port 220 positioned adjacent to the outlet port 216 of the inlet duct 212, and two outlet ports 222. In this embodiment, the outlet ports 222 are formed in an upper section 224 of the detachable section 212 of the water tank 120. This upper section 224 is located within a recessed section 226 of the upper wall 126 of the water tank 120.

As illustrated in FIG. 9, when the water tank 120 is mounted on the base 70 the inner wall 124 surrounds the upper wall of the base 70 to expose the open upper end of the upper cylindrical section 88 of the upper wall. The water tank 120 includes a handle 230 to facilitate removal of the water tank 120 from the base 70. The handle 230 is pivotably connected to the water tank 120 so as to be moveable relative to the water tank 120 between a stowed position, in which the handle 230 is housed within a recessed section 232 of the upper wall 126 of the water tank 120, and a deployed position, in which the handle 230 is raised above the upper wall 126 of the water tank 120 so that it may be gripped by a user. One or more resilient elements, such as torsion springs, may be provided in the recessed section 196 of the upper wall 126 for biasing the handle 230 towards its deployed position.

When the nozzle 14 is mounted on the body 12, the base 26 of the outer casing section 22 of the nozzle 14 is located over the open end of the upper cylindrical section 88 of the upper wall of the base 70, and the base 56 of the front casing section 50 of the nozzle 14 is located over the recessed portion 226 of the upper wall 126 of the water tank 120. The user then pushes the nozzle 14 towards the body 12 so that the base 26 enters the upper cylindrical section 88 of the upper wall of the base 70. When the bases 26, 56 of the nozzle 14 are fully inserted in the body 12, a first annular sealing member forms an air tight seal between the lower end of the base 26 and an annular ledge extending radially inwardly from the cylindrical section 88 of the upper wall of the base 70. A resilient, bellows-shaped ducting section 227 attached to the lower surface of the upper section 224 of the detachable section 212 of the water tank 120 urges the upper section 224 upwardly towards the nozzle 14 so as to form an air-tight seal between the outlet duct 218 and the base 56 of the nozzle 14.

A mechanism is provided for releasably retaining the nozzle 14 on the body 12. The mechanism is similar to the one described in our co-pending patent application WO 2013/132218, the contents of which are incorporated herein by reference. In overview, the body 12 comprises a button 240, a retaining member 242 for engaging the nozzle 14, and an annular actuator 244. When the button 240 is depressed by the user, the button 240 applies a force to the actuator 244 which causes the actuator 244 to rotate against the biasing force of a spring. The rotation of the actuator 244 moves the retaining member 242 away from the nozzle 14 to allow the nozzle 14 to be lifted from the body 12 by the user. Once the nozzle 14 has been lifted from the body 12, the button 240 may be released by the user. The spring urges the actuator 244 to rotate to move the retaining member 242 back to its retaining position.

As described above, a button 75 for controlling the operation of the humidifying apparatus may be located on the outer wall 72 of the base 70 of the body 12. The button 75 may be used to activate and deactivate the motor 92 to switch on and switch off the humidifying apparatus. Additionally, the humidifying apparatus 10 comprises a remote control 260 for transmitting control signals to a user interface circuit 262 of the humidifying apparatus 10. FIG. 16 illustrates schematically a control system for the humidifying apparatus 10, which includes the remote control 260, a user interface circuit 262 and other electrical components of the humidifying apparatus 10. In overview, the remote control 260 comprises a plurality of buttons which are depressible by the user, and a control unit for generating and transmitting infrared light signals in response to depression of one of the buttons. The infrared light signals are emitted from a window located at one end of the remote control 260. The control unit is powered by a battery located within a battery housing of the remote control 260.

A first button is used to activate and deactivate the motor 92, and a second button is used to set the speed of the motor 92, and thus the rotational speed of the impeller 90. The control system may have a discrete number of user selectable speed settings, each corresponding to a respective different rotational speed of the motor 92. A third button is used to set a desired level for the relative humidity of the environment in which the humidifying apparatus 10 is located, such as a room, office or other domestic environment. For example, the desired relative humidity level may be selected within a range from 30 to 80% at 20° C. through repeated actuation of the third button.

The user interface circuit 262 comprises a switch which is actuated through user operation of the button 75, a sensor or receiver 264 for receiving signals transmitted by the remote control 260, and a display 266 for displaying a current operational setting of the humidifying apparatus 10. For example, the display 266 may normally indicate the currently selected relative humidity level. As the user changes the rotational speed of the motor 92, the display 266 may indicate briefly the currently selected speed setting.

The receiver 264 and the display 266 may be located immediately behind a transparent or translucent part of the outer wall 72 of the base 70.

The user interface circuit 262 is connected to the drive circuit 94. The drive circuit 94 comprises a microprocessor and a motor driver for driving the motor 92. A mains power cable (not shown) for supplying electrical power to the humidifying apparatus 10 extends through an aperture formed in the base 70. The cable is connected to a plug. The drive circuit 94 comprises a power supply unit connected to the cable. The user interface may also comprise one or more LEDs for providing a visual alert depending on a status of the humidifying apparatus 10. For example, a first LED 268 may be illuminated to indicate that the water tank 120 has become depleted, as indicated by a signal received by the drive circuit 94 from the level sensor 206.

A humidity sensor 270 is also provided for detecting the relative humidity of air in the external environment, and for supplying a signal indicative of the detected relative humidity to the drive circuit 94. In this example the humidity sensor 270 may be located immediately behind the air inlet 74 to detect the relative humidity of the air flow drawn into the humidifying apparatus 10. The user interface may comprise a second LED 272 which is illuminated by the drive circuit 94 when an output from the humidity sensor 270 indicates that the relative humidity of the air flow entering the humidifying apparatus 10, $H_D$, is at or above the desired relative humidity level, $H_S$, set by the user.

To operate the humidifying apparatus 10, the user actuates the first button of the remote control, in response to which the remote control 260 generates a signal containing data indicative of the actuation of this first button. This signal is received by the receiver 264 of the user interface circuit 262. The operation of the button is communicated by the user interface circuit 262 to the drive circuit 94, in response to which the drive circuit 94 actuates the UV lamp 160 to irradiate water stored in the outlet chamber 144 of the water reservoir 140. In this example, the drive circuit 94 simultaneously activates the motor 92 to rotate the impeller 90. The rotation of the impeller 90 causes air to be drawn into the body 12 through the air inlet 74. An air flow passes through the impeller housing 104 and the guide vanes 100. Downstream from the guide vanes 100, a portion of the air emitted from the guide vanes 100 enters the duct 110 through the inlet port 112, whereas the remainder of the air emitted from the guide vanes 100 is conveyed along the first air passageway 76 to the first air inlet 28 of the nozzle 14. The impeller 90 and the motor 92 may thus be considered to generate a first air flow which is conveyed to the nozzle 14 by the first air passageway 76 and which enters the nozzle 14 through the first air inlet 28.

The first air flow enters the first interior passage 46 at the lower end thereof. The first air flow is divided into two air streams which pass in opposite directions around the bore 20 of the nozzle 14. As the air streams pass through the first interior passage 46, air enters the mouth 48 of the nozzle 14. The air flow rate into the mouth 48 is preferably substantially even about the bore 20 of the nozzle 14. The mouth 48 guides the air flow towards the first air outlet 30 of the nozzle 14, from where it is emitted from the humidifying apparatus 10.

The air flow emitted from the first air outlet 30 causes a secondary air flow to be generated by the entrainment of air from the external environment, specifically from the region around the first air outlet 30 and from around the rear of the nozzle 14. Some of this secondary air flow passes through the bore 20 of the nozzle 14, whereas the remainder of the secondary air flow becomes entrained, in front of the nozzle 14, within the air flow emitted from the first air outlet 30.

As mentioned above, with rotation of the impeller 90 air enters the second air passageway 78 through the inlet port 112 to form a second air flow. The second air flow passes through the duct 110 and the inlet duct 210 of the water tank 210 to be emitted from the outlet port 214 over the water stored in the outlet section of the outlet chamber 144. When the drive circuit 94 actuates the vibration of the transducer 156 to atomize water stored in the outlet section of the outlet chamber 144 of the water reservoir 140, airborne water droplets above the water located within the outlet chamber 144 of the water reservoir 140. The transducer 156 may be actuated in response to a user input received from the remote control 260, and/or a fixed time period following the actuation of the motor 92 to create the air flows through the humidifying apparatus 10.

As water within the water reservoir 140 is atomized, the water reservoir 140 is constantly replenished with water received from the water tank 120 via the inlet chamber 142, so that the level of water within the water reservoir 140 remains substantially constant while the level of water within the water tank 120 gradually falls. As water enters the outlet chamber 144 from the inlet chamber 142, it is guided by the baffle plate 200 to flow along the upper portion of the tube 178 so that it is irradiated with ultraviolet radiation emitted from the upper portion of the tube 178 before passing through the aperture 204 to enter the outlet section of the outlet chamber 144. This water is then further irradiated with ultraviolet radiation emitted from the lower portion of the tube 178 before being atomized by the transducer 156.

With rotation of the impeller 90, airborne water droplets become entrained within the second air flow emitted from the outlet port 214 of the inlet duct 212. The—now moist—second air flow passes upwardly through the outlet duct 218 to the second air inlets 58 of the nozzle 14, and enters the second interior passage 68 within the front section 18 of the nozzle 14.

At the base of the second interior passage 68, the second air flow is divided into two air streams which pass in opposite directions around the bore 20 of the nozzle 14. As the air streams pass through the second interior passage 68, each air stream is emitted from the second air outlet 60. The emitted second air flow is conveyed away from the humidifying apparatus 10 within the air flow generated through the emission of the first air flow from the nozzle 14, thereby enabling a humid air current to be experienced rapidly at a distance of several metres from the humidifying apparatus 10.

The moist air flow is emitted from the nozzle 14 until the relative humidity $H_D$ of the air flow entering the humidifying apparatus 10, as detected by the humidity sensor 270, is 1% at 20° C. higher than the relative humidity level $H_S$ selected by the user using the third button of the remote control 260. The emission of the moistened air flow from the nozzle 14 may then be terminated by the drive circuit 94, preferably by changing the mode of vibration of the transducer 156. For example, the frequency of the vibration of the transducer 156 may be reduced to a frequency $f_3$, where $f_1 > f_3 \geq 0$, below which atomization of the stored water is not performed. Alternatively the amplitude of the vibrations of the transducer 156 may be reduced. Optionally, the motor 92 may also be stopped so that no air flow is emitted from the nozzle 14. However, when the humidity sensor 270 is located in close proximity to the motor 92 it is preferred that the motor 92 is operated continually to avoid undesirable humidity fluctuation in the local environment of the humidity sensor 270.

As a result of the termination of the emission of a moist air flow from the humidifying apparatus 10, the relative humidity $H_D$ detected by the humidity sensor 270 will begin to fall. Once the relative humidity of the air of the environment local to the humidity sensor 270 has fallen to 1% at 20° C. below the relative humidity level $H_S$ selected by the user, the drive circuit 94 re-activates the vibration of the transducer 156 in the atomization mode. If the motor 92 has been stopped, the drive circuit 94 simultaneously re-activates the motor 92. As before, the moist air flow is emitted from the nozzle 14 until the relative humidity $H_D$ detected by the humidity sensor 270 is 1% at 20° C. higher than the relative humidity level $H_S$ selected by the user.

This actuation sequence of the transducer 156 (and optionally the motor 92) for maintaining the detected humidity level around the level selected by the user continues until the first button is actuated again, or until a signal is received from the level sensor 206 indicating that the level of water within the water reservoir 140 has fallen below the minimum level. If the first button is actuated, or upon receipt of this signal from the level sensor 206, the drive circuit 94 deactivates the motor 92, the transducer 156 and the UV lamp 160 to switch off the humidifying apparatus 10. The drive circuit 94 also deactivates these components of the humidifying apparatus 10 in response to a signal received from the proximity sensor 208 indicating that the water tank 120 has been removed from the base 70.

The invention claimed is:

1. A humidifying apparatus comprising:
   a body comprising a chamber;
   a water tank for supplying water to the chamber;
   an air flow generating device for generating an air flow over water stored in the chamber;
   a humidifying device for humidifying the air flow with water from the chamber;
   a cartridge removably locatable within the body, the cartridge comprising an ultraviolet radiation emitting lamp for irradiating water in the chamber, the chamber comprising an ultraviolet radiation transparent tube for receiving the lamp; and
   at least one air outlet for emitting the air flow;
   wherein the body comprises a plurality of supports for supporting the cartridge therebetween, each support comprising a curved track for guiding movement of the cartridge towards the tube, the tracks being shaped to orient the cartridge for insertion of the lamp into the tube as the cartridge moves along the tracks towards the tube.

2. The apparatus of claim 1, wherein the cartridge is slidable along the tracks.

3. The apparatus of claim 1, wherein the cartridge comprises a plurality of runners, each runner being locatable within a respective track.

4. The apparatus of claim 3, wherein the width of each track varies along the length of the track.

5. The apparatus of claim 4, wherein the width of each track increases along the length of the track.

6. The apparatus of claim 4, wherein the width of each track increases from a first width which is substantially equal to the width of its respective runner, to a second width which is substantially equal to the length of is respective runner.

7. The apparatus of claim 1, wherein the body comprises a bottom wall defining an aperture through which the cartridge is insertable into the body, and wherein each support is connected to the bottom wall of the body.

8. The apparatus of claim 7, wherein each track extends from the bottom wall of the body towards the chamber.

9. The apparatus of claim 7, wherein the longitudinal axis of the tube is substantially parallel to the bottom wall of the body.

10. The apparatus of claim 7, wherein the body comprises a panel for closing the aperture, and wherein the panel comprises a mechanism for urging the cartridge towards a position in which the lamp is inserted fully within the tube.

11. The apparatus of claim 7, wherein the humidifying device comprises a transducer, and wherein the transducer is removable from the body through the aperture.

* * * * *